United States Patent
Iizuka et al.

(10) Patent No.: US 11,067,535 B2
(45) Date of Patent: Jul. 20, 2021

(54) FLUORESCENT TESTING SYSTEM, DIELECTROPHORESIS DEVICE, AND MOLECULAR TESTING METHOD

(71) Applicants: SHARP KABUSHIKI KAISHA, Sakai (JP); The University of Tokyo, Tokyo (JP)

(72) Inventors: Kunihiko Iizuka, Sakai (JP); Yoshihisa Fujimoto, Sakai (JP); Takeshi Mitsunaka, Sakai (JP); Soo-Hyeon Kim, Tokyo (JP); Teruo Fujii, Tokyo (JP)

(73) Assignees: SHARP KABUSHIKI KAISHA, Sakai (JP); The University of Tokyo, Tokyo (JP)

( * ) Notice: Subject to any disclaimer, the term of this patent is extended or adjusted under 35 U.S.C. 154(b) by 210 days.

(21) Appl. No.: 16/345,630

(22) PCT Filed: Aug. 2, 2017

(86) PCT No.: PCT/JP2017/027991
§ 371 (c)(1),
(2) Date: Apr. 26, 2019

(87) PCT Pub. No.: WO2018/078999
PCT Pub. Date: May 3, 2018

(65) Prior Publication Data
US 2019/0285579 A1    Sep. 19, 2019

(30) Foreign Application Priority Data

Oct. 27, 2016  (JP) .............................. JP2016-211119
Oct. 27, 2016  (JP) .............................. JP2016-211120
Apr. 12, 2017  (JP) .............................. JP2017-079251

(51) Int. Cl.
*B03C 5/00*   (2006.01)
*G01N 21/64*  (2006.01)
(Continued)

(52) U.S. Cl.
CPC ....... *G01N 27/44721* (2013.01); *B03C 5/005* (2013.01); *G01N 15/00* (2013.01);
(Continued)

(58) Field of Classification Search
CPC ......... B03C 5/005; B03C 5/026; B03C 5/028; G01N 21/6428; G01N 21/645; G01N 21/6454
See application file for complete search history.

(56) References Cited

U.S. PATENT DOCUMENTS 5,344,535 A * 9/1994 Betts ................. B03C 5/026
                                                  204/547
6,071,394 A * 6/2000 Cheng ................ B01J 19/0093
                                                  204/547
(Continued)

FOREIGN PATENT DOCUMENTS

JP    2005-506083 A    3/2005

OTHER PUBLICATIONS

Akin et al., "Real-Time Virus trapping and Fluorescent Imaging in Microfluidc Devices," NanoLetters 2004 vol. 4, No. 2, pp. 257-259 (Year: 2004).*

(Continued)

*Primary Examiner* — Alexander S Noguerola
(74) *Attorney, Agent, or Firm* — ScienBiziP, P.C.

(57) ABSTRACT

Provided are a fluorescent testing system, a dielectrophoresis device, and a molecular testing method that measure only fluorescence emitted from a test object without separating excitation light and the fluorescence by an optical filter and that are able to prevent reduction of an application range of (Continued)

a type of the fluorescence. A fluorescent testing system (1) includes: an excitation light source (23) that radiates excitation light (L1) to a test object (M) flowing in a microfluidic channel (22); a silicon integrated circuit (10) provided with a photon detection unit (13) that detects light by a photodiode (12); a dielectrophoresis electrode pair (16) that generates an electric field (EF) to draw the test object (M) onto the photodiode (12) by dielectrophoresis; and a control unit (24) that causes the excitation light source (23) to radiate the excitation light (L1) to the test object (M) that is drawn and causes the photon detection unit (13), after extinguishment of the excitation light (L1), to detect fluorescence (L2) emitted from the test object (M).

12 Claims, 20 Drawing Sheets

(51) Int. Cl.
    *G01N 27/447*     (2006.01)
    *G01N 15/00*     (2006.01)
    *G01N 27/00*     (2006.01)

(52) U.S. Cl.
    CPC ....... *G01N 21/645* (2013.01); *G01N 21/6428* (2013.01); *G01N 21/6454* (2013.01); *G01N 27/00* (2013.01); *G01N 2021/6439* (2013.01); *G01N 2021/6482* (2013.01)

(56) References Cited

U.S. PATENT DOCUMENTS

| | | | |
|---|---|---|---|
| 6,287,831 B1* | 9/2001 | Tai | C12M 47/06 204/194 |
| 7,744,737 B1* | 6/2010 | James | B03C 5/028 204/547 |
| 8,992,754 B2 | 3/2015 | Manaresi et al. | |
| 2005/0014201 A1 | 1/2005 | Deuthsch | |
| 2011/0312666 A1* | 12/2011 | Azimi | B01L 3/502738 506/39 |
| 2012/0224053 A1* | 9/2012 | Vykoukal | G01N 15/1463 348/135 |

OTHER PUBLICATIONS

"Epifluorescence Microscope Basics" from online ThermoFisher Scientific catalog; Jan. 14, 2021 from https://www.thermofisher.com/US/en/home/life-science/cell-analysis/cell-analysis-learning-center/molecular-probes-school-of-fluorescence/imaging-basics/fundamentals-of-fluorescence-microscopy/epif (Year: 2021).*

Vistas et al., "An amorphous silicon photodiode microfluidic chip to detect nanomolar quantities of HIV-1 virion infectivity factor," Analyst, 2014, 139, 3708 (Year: 2014).*

Marina Kobayashi et al., "Cancer Cell Analyses at the Single Cell-Level Using Electroactive Microwell Array Device", PLOS ONE 10(11): e0139980. doi:10.1371/ journal. pone.0139980 Nov. 11, 2015.

* cited by examiner

FIG. 14
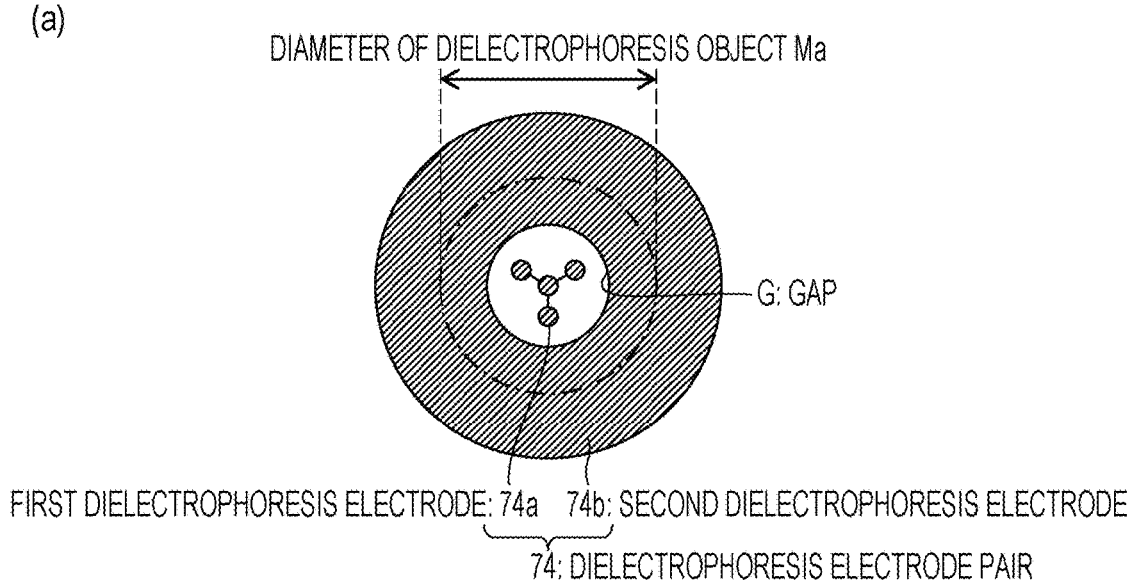
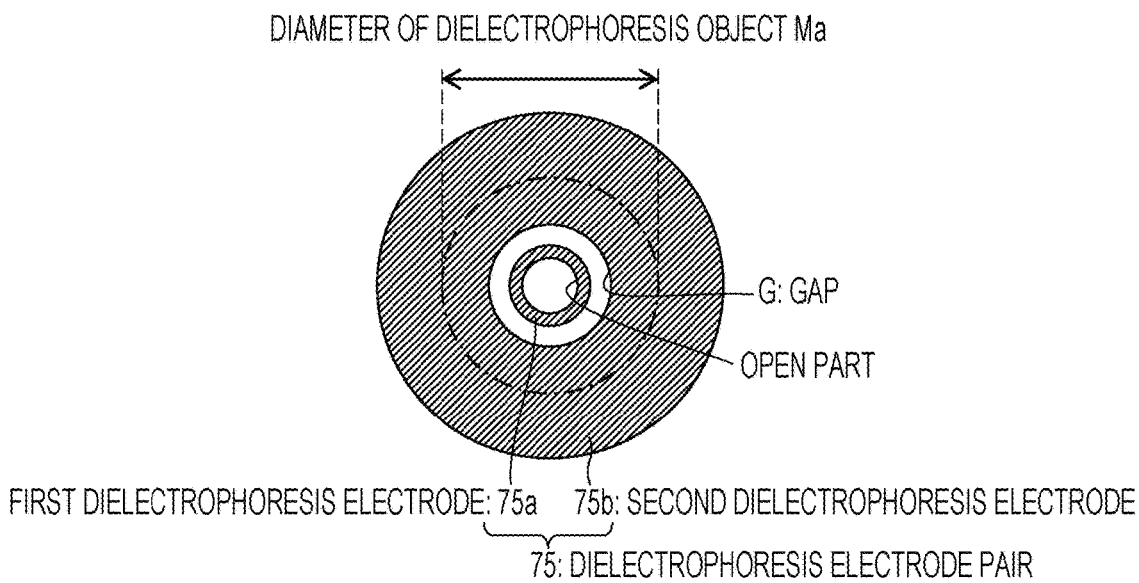

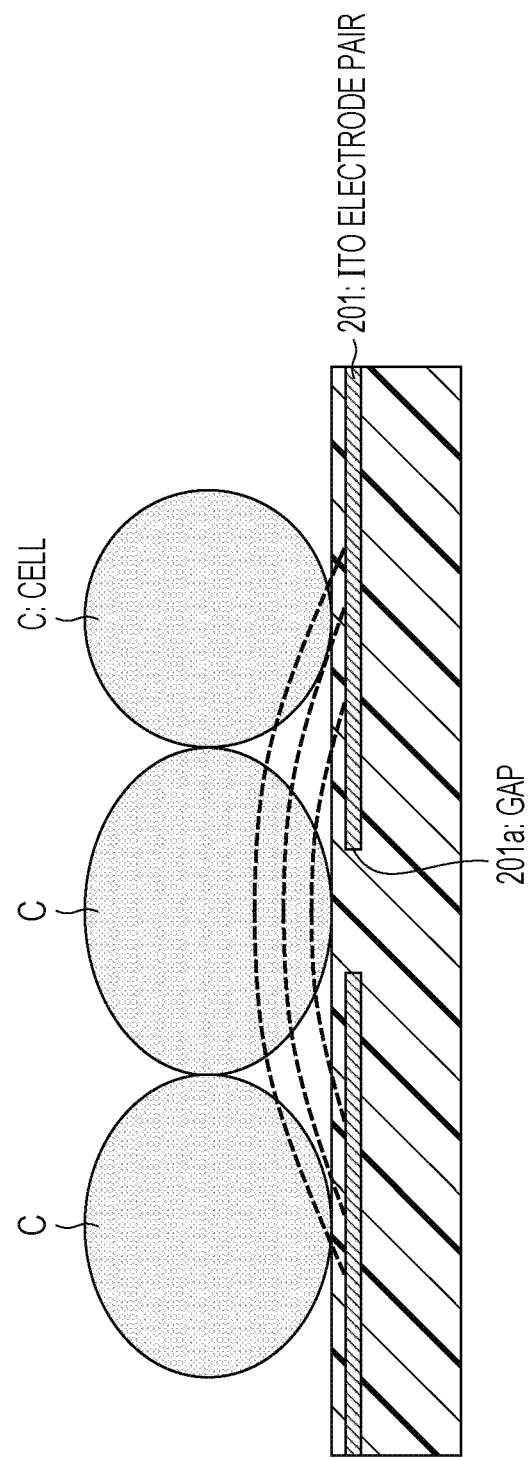

FLUORESCENT TESTING SYSTEM, DIELECTROPHORESIS DEVICE, AND MOLECULAR TESTING METHOD

TECHNICAL FIELD

The present invention relates to a fluorescent testing system, a dielectrophoresis device, and a molecular testing method that observe a fluorescent phenomenon from a test object, such as a minute biological sample or nonbiological sample, in fluid to thereby specify the test object.

BACKGROUND ART

With a fluorescent testing method that is generally used in many cases, fluorescence that is emitted is detected while irradiating a test object with excitation light. Specifically, by utilizing a difference of a wavelength of the excitation light and a wavelength of the fluorescence, the excitation light and the fluorescence are separated by an optical filter to detect only the fluorescence.

A method of the related art of collectively testing individual types of many cells by fluorescent test is disclosed, for example, in NPL 1.

NPL 1 proposes that cells flowing in a microfluidic channel are trapped into microwells by dielectrophoresis and testing whether fluorescence is observed and a type of the fluorescence is performed by using a fluorescent microscope. Such a method requires use of the fluorescent microscope, which is large and expensive, for the test.

On the other hand, for example, PTL 1 proposes a testing device that detects fluorescence from a fine particle in fluid.

In a testing device 100 disclosed in PTL 1, as illustrated in FIG. 18, a color filter 103 is provided above a pixel 102 using a photodiode 101 and an electrode 104 for dielectrophoresis is provided thereon. In the testing device 100, after a test object 110 formed of a fine particle is trapped onto the pixel 102 by dielectrophoresis, excitation light 105 is radiated and the excitation light 105 and fluorescence 106 are separated by the color filter 103 to perform detection by the pixel 102. Thereby, it is not necessary to use a fluorescent microscope.

CITATION LIST

Patent Literature

PTL 1: U.S. Pat. No. 8,992,754 (published on Mar. 31, 2015)

Non Patent Literature

NPL 1: Kobayashi M, Kim S H, Nakamura H, Kaneda S, Fujii T "Cancer Cell Analyses at the Single Cell-Level Using Electroactive Mircrowell Array Device." PLoS ONE 10(11): e0139980. doi:10.1371/journal.pone.0139980, Nov. 11, 2015

SUMMARY OF INVENTION

Technical Problem

In the testing device 100 as a fluorescent testing system of the related art disclosed in PTL 1 described above, however, the excitation light 105 and the fluorescence 106 are separated by the color filter 103. Thus, the color filter 103 that is incorporated needs to transmit the fluorescence 106 and block the excitation light 105. In other words, only a fluorescent material suitable for the incorporated color filter 103 is able to be used for the test and there is a problem that an application range of a type of the fluorescence is limited.

Note that, also in NPL 1, excitation light and fluorescence are separated by an optical filter to detect only the fluorescence, and thus there is a similar problem.

The invention is made in view of the aforementioned problems in the related art and an object thereof is to provide a fluorescent testing system, a dielectrophoresis device, and a molecular testing method that measure only fluorescence emitted from a test object without separating excitation light and the fluorescence by an optical filter and that are able to prevent reduction of an application range of a type of the fluorescence.

Solution to Problem

In order to solve the aforementioned problems, a fluorescent testing system in an aspect of the invention includes: an excitation light source that radiates excitation light to a test object; a silicon integrated circuit provided with a photon detection unit that detects light by a photodiode; an electrode pair that generates an electric field to draw the test object onto the photodiode by dielectrophoresis; and a control unit that causes the excitation light source to radiate the excitation light to the test object that is drawn and causes the photon detection unit, after extinguishment of the excitation light, to detect fluorescence emitted from the test object.

In order to solve the aforementioned problems, a dielectrophoresis device in an aspect of the invention is a dielectrophoresis device including at least one dielectrophoresis electrode pair that captures, by dielectrophoresis, a capture material flowing in a micro flow channel, in which the at least one dielectrophoresis electrode pair is constituted by a first dielectrophoresis electrode and a second dielectrophoresis electrode and a region including at least the first dielectrophoresis electrode and a gap between the first dielectrophoresis electrode and the second dielectrophoresis electrode is formed so as to be covered with one piece of the capture material.

In order to solve the aforementioned problems, a molecular testing method in an aspect of the invention includes: a first step of mixing a microbead having a capture antibody with a detection antibody, further combining a captured target molecule with the detection antibody, and causing solution, which includes the microbead, to flow in the flow channel of the fluorescent testing system according to the above aspect; a second step of capturing, by dielectrophoresis in the fluorescent testing system, the microbead above each electrode; a third step of causing a fluorescent substrate to flow in the flow channel; and a fourth step of detecting, by the fluorescent testing system, a fluorescent material generated when the fluorescent substrate reacts with an enzymatic label.

Advantageous Effects of Invention

According to an aspect of the invention, an effect of providing a fluorescent testing system, a dielectrophoresis device, and a molecular testing method that measure only fluorescence emitted from a test object without separating excitation light and the fluorescence by an optical filter and that are able to prevent reduction of an application range of a type of the fluorescence is exerted.

BRIEF DESCRIPTION OF DRAWINGS

FIGS. 14(a) and 14(b) illustrate the dielectrophoresis device in a modified example and are plan views illustrating a configuration of a dielectrophoresis electrode pair.

FIG. 21 is a sectional view illustrating a configuration of an ITO electrode pair in the dielectrophoresis device.

DESCRIPTION OF EMBODIMENTS

Embodiment 1

An embodiment of the invention will be described as follows with reference to FIGS. 1 and 2.

A fluorescent testing system of the present embodiment is widely applicable in various fields of, for example, observation of staining of a cell constituent, gene expression, and localized movement of a dynamic component, and the like. The fluorescent testing system relates to a fluorescent testing system that observes a fluorescent phenomenon from a minute biological or nonbiological sample in fluid to thereby specify an object and is used for research, clinical test, or the like in biology and medicine. A test object is not limited to a solid and may be liquid.

(Configuration of Fluorescent Testing System)

A configuration of the fluorescent testing system of the present embodiment will be described with reference to FIG. 2. FIG. 2 is a sectional view illustrating a configuration of an example of the fluorescent testing system of the present embodiment.

Figure 2:
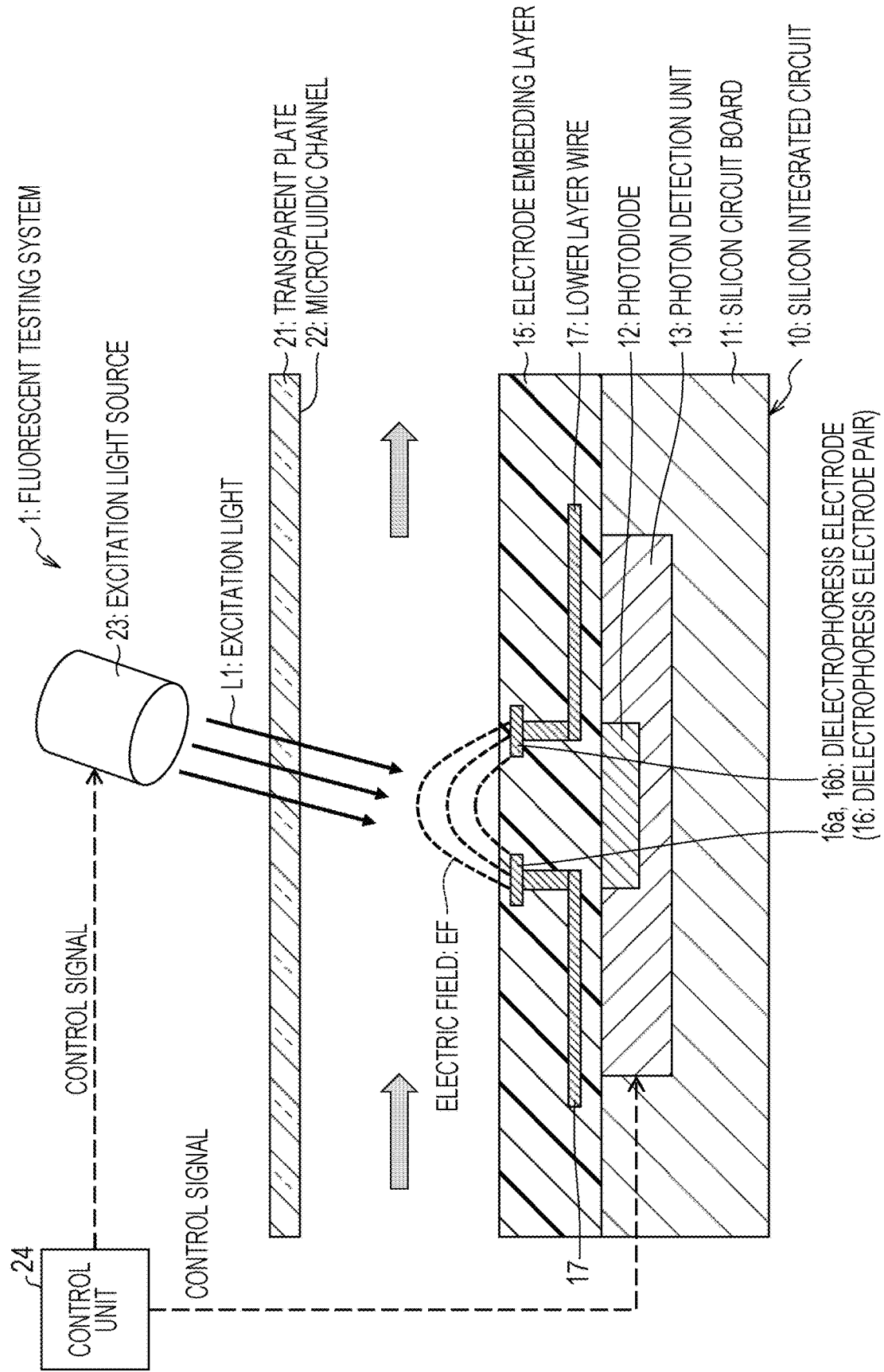
FIG. 2 is a sectional view illustrating a configuration of an example of the fluorescent testing system.

As illustrated in FIG. 2, a fluorescent testing system 1 of the present embodiment includes a silicon integrated circuit 10 provided with a photon detection unit 13 that detects light by a photodiode 12, a dielectrophoresis electrode pair 16 that generates an electric field to draw a test object M described below onto the photodiode 12 by dielectrophoresis, an excitation light source 23, and a control unit 24 that synchronously controls a light emission operation of the excitation light source 23 and a detection operation of the photon detection unit 13.

The silicon integrated circuit 10 is formed with an electrode embedding layer 15 laminated on a silicon circuit board 11.

In the silicon circuit board 11, a circuit constituted by the photodiode 12 and the photon detection unit 13 that detects light by using the photodiode 12 is formed. As the photodiode 12, for example, a single photon avalanche diode (SPAD) is usable.

In the electrode embedding layer 15, the dielectrophoresis electrode pair 16 constituted by dielectrophoresis electrodes 16a and 16b to generate an electric field for dielectrophoresis is embedded and a lower layer wire 17 that is connected to the dielectrophoresis electrodes 16a and 16b to guide a voltage to the dielectrophoresis electrodes 16a and 16b is embedded. The lower layer wire 17 is provided to be lower than the dielectrophoresis electrodes 16a and 16b in the electrode embedding layer 15.

The electrode embedding layer 15 includes a transparent resin layer to indicate an existence of the dielectrophoresis electrode pair 16.

In the dielectrophoresis electrode pair 16, when the voltage is applied to the dielectrophoresis electrodes 16a and 16b through the lower layer wire 17, an electric field EF is generated between the dielectrophoresis electrodes 16a and 16b. When the test object M passes through the electric field EF, the test object M is captured by dielectrophoresis.

Next, a transparent plate 21 is provided above the electrode embedding layer 15 in the silicon integrated circuit 10, resulting that a microfluidic channel 22 as a flow channel is formed between the electrode embedding layer 15 and the transparent plate 21. The microfluidic channel 22 is configured so that the test object M flows therein.

The excitation light source 23 radiates excitation light L1 through the transparent plate 21 toward between the dielectrophoresis electrodes 16a and 16b. As the excitation light source 23, for example, various light sources such as a semiconductor light emitting element (LED), an organic EL, and a semiconductor laser are usable. A plurality of light sources may be used.

In the present embodiment, the excitation light source 23 irradiates the test object M with the excitation light L1 to emit fluorescence from the test object M. Thus, for the excitation light source 23, for example, ultraviolet light, near-ultraviolet light, or visible light is used. That is, a phenomenon of the fluorescence is such that a molecule and an ion of the test object M that absorb ultraviolet light, near-ultraviolet light, or visible light are excited, and then, the molecule and the ion are shifted to an intermediate excited state to emit light having a wavelength longer than that of the excitation light therefrom and are returned to a ground state. Thus, the wavelength of the excitation light L1 radiated to the test object M by the excitation light source 23 is required to be shorter than a wavelength of the fluorescence emitted from the test object M.

The control unit 24 controls blinking of the excitation light source 23 and driving of the photon detection unit 13.

Meanwhile, in such a kind of fluorescent testing system of the related art, by utilizing a difference of the wavelength of the excitation light and the wavelength of the fluorescence, the excitation light and the fluorescence are separated by an optical filter to detect only the fluorescence. Thus, only a fluorescent material suitable for the incorporated filter is able to be used for the test and there is a problem that an application range of a type of the fluorescence is limited.

Here, an average time during which the excited state is returned to the ground state is called a fluorescent lifetime. In other words, the fluorescent lifetime is a time required for fluorescent intensity to be reduced to 1/e. Thus, the fluorescence does not disappear even when the time is elapsed. It is always possible to detect the fluorescence after extinguishment of the excitation light theoretically, if not practically. From a practical viewpoint, when the detection is performed as soon as possible after the extinguishment of the excitation light, the fluorescence is detected more easily because the fluorescent is strong. As a reference, it is desirable to perform the detection within a time period of a few times the fluorescent lifetime.

As a result, by using the fluorescent lifetime, fluorescence L2 that is emitted is able to be observed after the extinguishment of the excitation light L1 without using an optical filter that separates the excitation light L1 and the fluorescence L2 on the basis of the wavelengths.

Thus, the control unit 24 of the present embodiments controls the excitation light source 23 to radiate the excitation light L1 to the test object M drawn by the dielectrophoresis. Then, the control unit 24 stops lighting of the excitation light source 23 after a fixed time period. Next, the control unit 24 drives the photon detection unit 13 during a time period of the fluorescent lifetime to measure the fluorescence L2 emitted from the test object M.

Specifically, the control unit 24 performs control so that the excitation light source 23 radiates the excitation light L1 in a pulsed manner. The pulse of the excitation light L1 is set in advance so that a light-off period is within the time period of the fluorescent lifetime of the fluorescence L2. As a result, only the fluorescence is emitted from the test object M, so that the photon detection unit 13 detects the fluorescence L2 after the extinguishment of the excitation light without using an optical filter.

(Measurement Operation of Fluorescent Testing System)

A specific operation when the test object M is measured by using the fluorescent testing system 1 having the configuration described above will be described with reference to FIG. 1. FIG. 1 is a sectional view illustrating a state where the test object M flowing in the microfluidic channel 22 on the silicon integrated circuit 10 is captured between the dielectrophoresis electrodes 16a and 16b by dielectrophoresis. Note that, description will be given here by assuming that the test object M is, for example, a cell to which a fluorescent marker FM is added.

Figure 1:
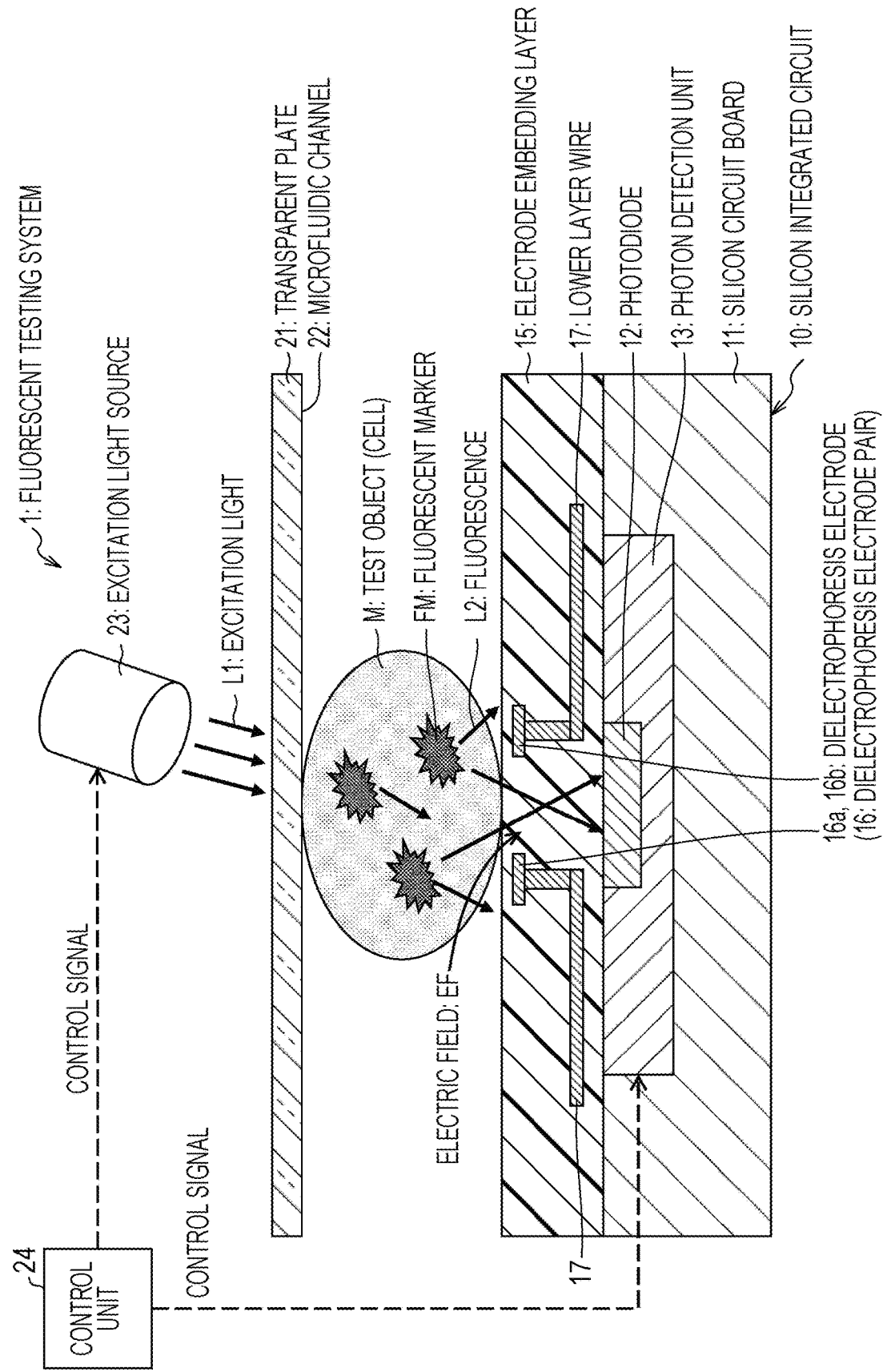
FIG. 1 illustrates a configuration of a fluorescent testing system in Embodiment 1 of the invention and is a sectional view illustrating a state where a test object flowing in a microfluidic channel on a silicon integrated circuit is captured between dielectrophoresis electrodes by dielectrophoresis.

As illustrated in FIG. 1, for example, the cell that is the test object M is supplied to the microfluidic channel 22 between the electrode embedding layer 15 and the transparent plate 21 provided above the electrode embedding layer 15. In a case where the voltage is applied to the dielectrophoresis electrodes 16a and 16b of the dielectrophoresis electrode pair 16 through the lower layer wire 17 in such a state, the electric field EF is generated between the dielectrophoresis electrodes 16a and 16b. Thereby, the cell that is the test object M is drawn toward between the dielectrophoresis electrodes 16a and 16b by the dielectrophoresis. At this time, the control unit 24 performs control so that the excitation light source 23 is turned on, and is turned off after a fixed time period, and the photon detection unit 13 is driven preferably within the time period of the fluorescent lifetime from that time. Specifically, the excitation light source 23 radiates the excitation light L1 toward between the dielectrophoresis electrodes 16a and 16b by switching on and off the excitation light L1 in the pulsed manner. Then, in an on period of the excitation light source 23, the fluorescent marker FM of the cell that is the test object M absorbs the excitation light L1 from the excitation light source 23. Thereby, the fluorescent marker FM of the cell emits the fluorescence L2. At this time, the excitation light L1 is also radiated. Thus, in the present embodiment, since the excitation light source 23 radiates the excitation light L1 in the pulsed manner, the excitation light L1 is sometimes extinguished. Thereby, the photon detection unit 13 is driven when the excitation light L1 is extinguished, and only the fluorescence L2 is received by the photon detection unit 13, so that only the fluorescent L2 is able to be detected.

In this manner, the fluorescent testing system 1 of the present embodiment includes the excitation light source 23 that radiates the excitation light L1 to the test object M flowing in the microfluidic channel 22 as the flow channel, the silicon integrated circuit 10 provided with the photon detection unit 13 that detects light by the photodiode 12, the dielectrophoresis electrode pair 16 that generates the electric field EF to draw the test object M onto the photodiode 12 by dielectrophoresis, and the control unit 24 that causes the excitation light source 23 to radiate the excitation light L1 to the test object M that is drawn and causes the photon detection unit 13 to detect the fluorescence L2, which is emitted from the test object M, after the extinguishment of the excitation light L1.

As a result, after the extinguishment of the excitation light L1, the excitation light L1 is not incident and only the fluorescence L2 is detected by the photon detection unit 13.

Accordingly, it is possible to provide the fluorescent testing system 1 that measures only the fluorescence L2 emitted from the test object M without separating the excitation light L1 and the fluorescence L2 by an optical filter and is thus able to prevent reduction of an application range of a type of the fluorescence L2.

That is, it becomes possible to use a wide variety of fluorescent materials without limiting the wavelengths of the excitation light L1 and the fluorescence L2.

Moreover, in the fluorescent testing system 1 of the present embodiment, the dielectrophoresis electrode pair 16 is constituted by the dielectrophoresis electrodes 16a and 16b, and a region including at least the first dielectrophoresis electrode 16a and a gap between the dielectrophoresis electrode 16a and the dielectrophoresis electrode 16b is preferably formed so as to be covered with one test object M.

Thereby, only one test object M is captured by the dielectrophoresis electrode pair 16. Additionally, there is no case where retaining of a plurality of test objects M hinders a flow of another test object M that flows in the microfluidic channel.

Thus, it is possible to provide the fluorescent testing system 1 that is able to prevent a plurality of test objects M from being captured and prevent a flow of the test object M from being hindered near the dielectrophoresis electrode pair 16.

Embodiment 2

Figure 3:
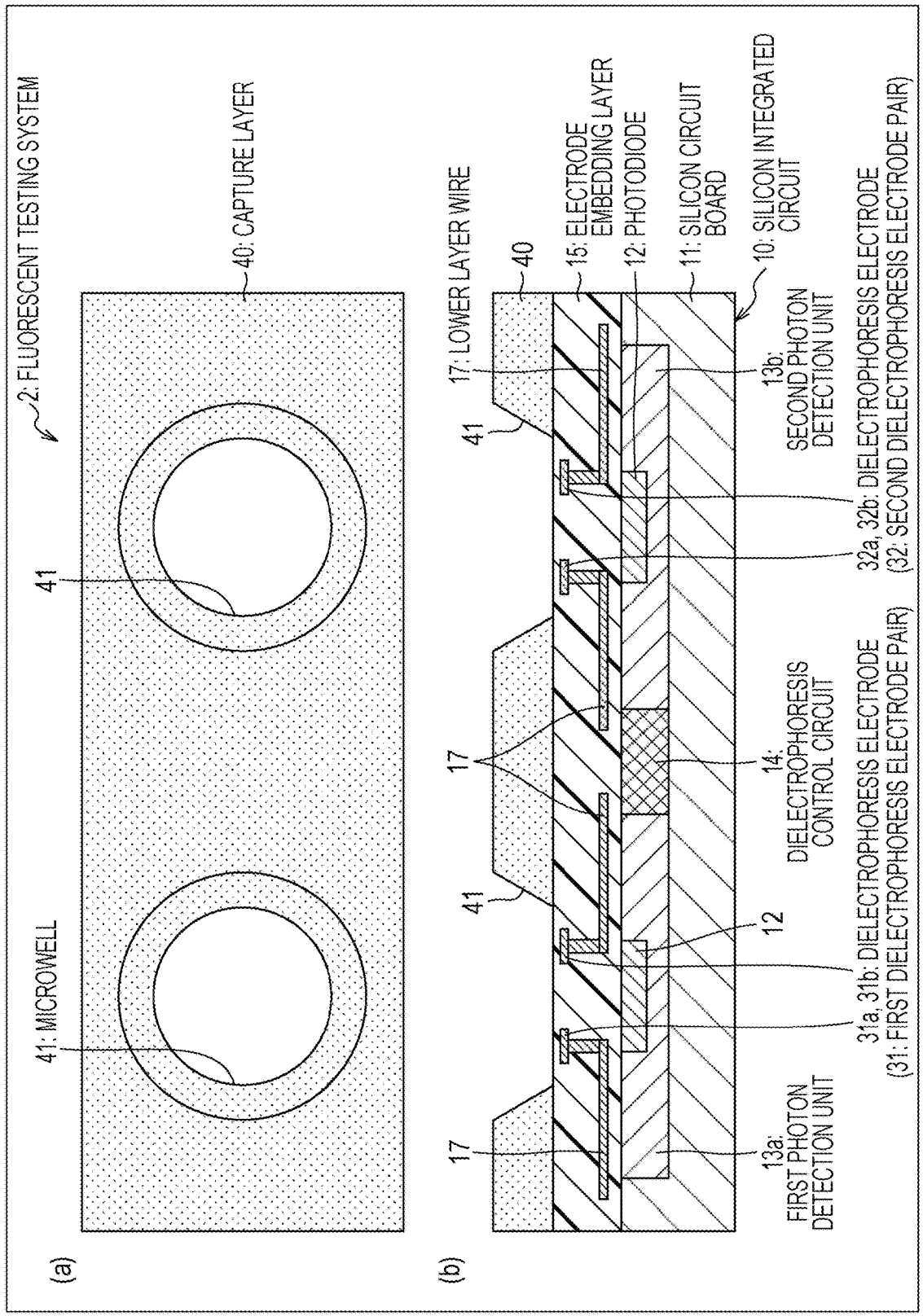
FIG. 3(a) illustrates a configuration of a fluorescent testing system in Embodiment 2 of the invention and is a plan view illustrating the configuration of the fluorescent testing system and FIG. 3(b) is a sectional view illustrating the configuration of the fluorescent testing system.

Another embodiment of the invention will be described as follows with reference to FIGS. 3 and 4. Note that, the present embodiment is the same as Embodiment 1 described above other than a configuration described in the present embodiment. For convenience of description, members having the same functions as those of the members illustrated in the figures of Embodiment 1 described above will be given the same reference signs and description thereof will be omitted.

A difference lies in that a fluorescent testing system 2 of the present embodiment includes, in addition to the configuration of the fluorescent testing system 1 of Embodiment 1 described above, a plurality of first and second photon detection units 13a and 13b, and a first dielectrophoresis electrode pair 31 and a second dielectrophoresis electrode pair 32 that respectively correspond to the first photon detection unit 13a and the second photon detection unit 13b, and a capture layer 40 is provided on an upper side of the electrode embedding layer 15 in the silicon integrated circuit 10, and a microwell 41 as a through hole is provided between the first paired dielectrophoresis electrodes 31 and between the second paired dielectrophoresis electrodes 32 in the capture layer 40.

A configuration of the fluorescent testing system 2 of the present embodiment will be described with reference to FIGS. 3 and 4. FIG. 3(a) is a plan view illustrating the configuration of the fluorescent testing system 2 of the present embodiment. FIG. 3(b) is a sectional view illustrating the configuration of the fluorescent testing system 2. FIG. 4 is a sectional view illustrating a state where a cell that is the test object M is contained in the microwell 41 when the test object M is measured by using the fluorescent testing system 2. Note that, in FIGS. 3(a), 3(b), and 4, the transparent plate 21, the excitation light source 23, and the control unit 24 are omitted.

As illustrated in FIGS. 3(a) and 3(b), the fluorescent testing system 2 of the present embodiment includes, in addition to the configuration of the fluorescent testing system 1 of Embodiment 1 described above, the plurality of first and second photon detection units 13a and 13b, and the first dielectrophoresis electrode pair 31 and the second dielectrophoresis electrode pair 32 that respectively correspond to the first photon detection unit 13a and the second photon detection unit 13b.

A dielectrophoresis control circuit 14 is incorporated between the first photon detection unit 13a and the second photon detection unit 13b in the silicon circuit board 11 of the silicon integrated circuit 10. The dielectrophoresis control circuit 14 is configured to individually control the electric field EF generated by the first dielectrophoresis electrode pair 31 and the second dielectrophoresis electrode pair 32 that are respectively positioned above the first photon detection unit 13a and the second photon detection unit 13b. This makes it possible to have a plurality of test objects M tested at the same time.

The capture layer 40 is provided on the upper side of the electrode embedding layer 15 in the silicon integrated circuit 10 and the microwell 41 as the through hole is provided between the first paired dielectrophoresis electrodes 31 and between the second paired dielectrophoresis electrodes 32 in the capture layer 40.

The capture layer 40 is made from, for example, silicon oxide ($SiO_2$) and uses one that blocks light and has less autofluorescence. This makes it possible to prevent stray light such as external light from being incident on the photodiode 12 and prevent fluorescence other than one emitted from the test object M from being incident on the photodiode 12 from the capture layer 40.

The microwell 41 has a circular shape in a horizontal section and has, in a vertical section, an inverted truncated cone shape in which an upper surface is enlarged in comparison with a lower surface in the capture layer 40 as illustrated in FIG. 3(b). The microwell 41 having the inverted truncated cone shape is formed so that a diameter thereof matches a diameter of the test object M having an almost sphere. A depth of the microwell 41 may be a depth at which one test object M flowing in the microfluidic channel 22 is able to be inserted so as to temporarily stop in the microwell 41. For example, the depth is about H/4 to H/2 relative to a height H of the test object M.

Figure 4:
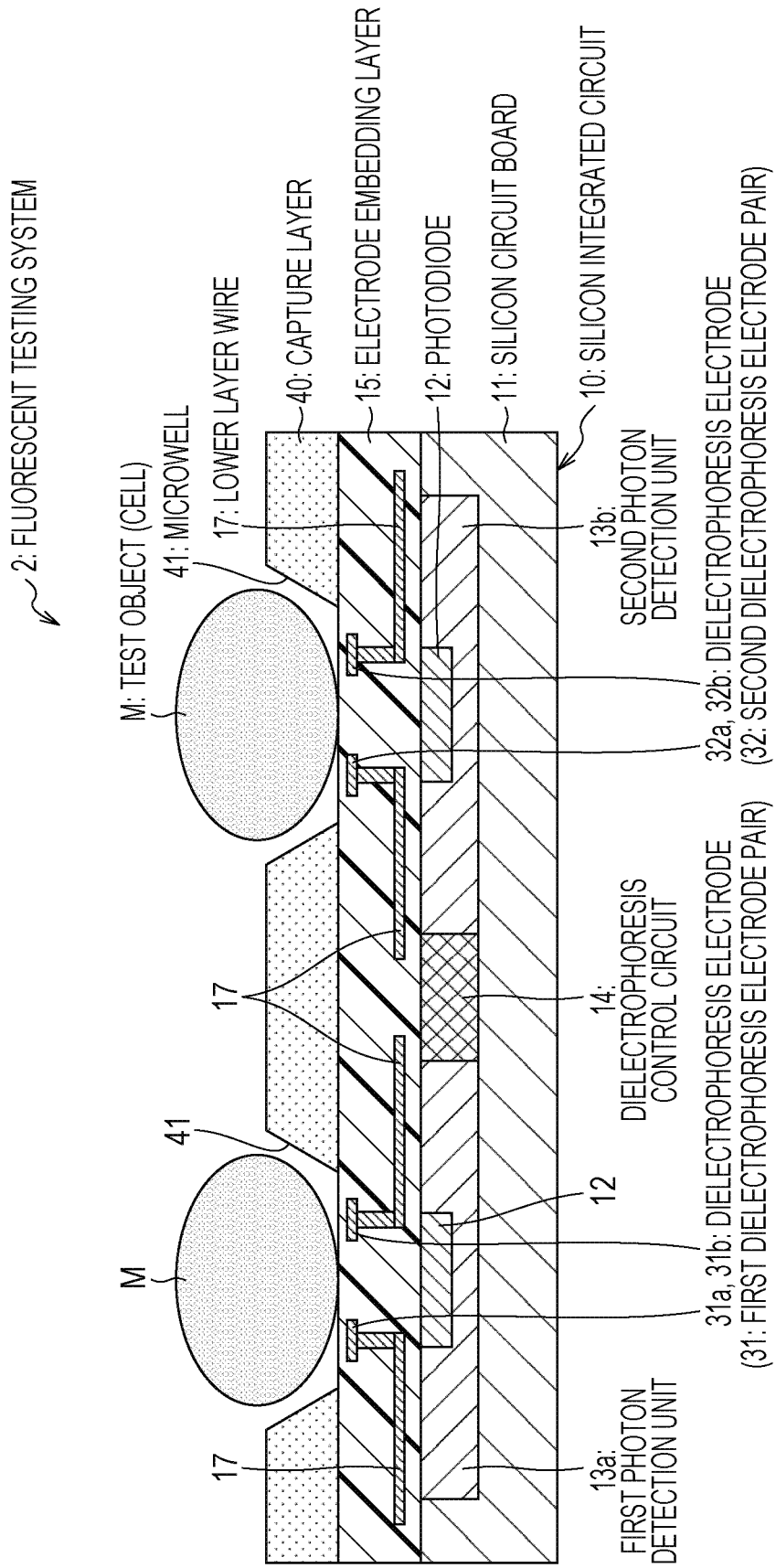
FIG. 4 is a sectional view illustrating a state where a cell that is a test object is contained in a microwell when the test object is measured by using the fluorescent testing system.

As a result, in a case where sphere cells that are test objects M are measured by using the fluorescent testing system 2 of the present embodiment, as illustrated in FIG. 4, each of the cells is able to be easily captured in each of microwells 41 in the capture layer 40 on respective photodiodes 12 of the first photon detection unit 13a and the second photon detection unit 13b.

In this manner, in the present embodiment, by selecting a diameter of a well structure such as the microwell 41 in accordance with a size of the test object M, it is possible to increase possibility that a single test object M is captured on each of the photodiodes 12.

In this manner, in the fluorescent testing system 2 of the present embodiment, the capture layer 40 that captures the test object M is formed above the first dielectrophoresis electrode pair 31 and the second dielectrophoresis electrode pair 32. Moreover, the microwell 41 as the through hole in which one test object M is inserted and through which the fluorescence L2 is passed is formed at a position of the photodiode 12 in plan view in the capture layer 40.

Thereby, it is possible that one test object M is fitted and captured in the microwell 41 formed at the position of the photodiode 12 in plan view in the capture layer 40 and only the fluorescence L2 emitted from the one test object M is measured by the photodiode 12 by causing the fluorescence L2 to pass through the microwell 41. Thus, since one test object M is easily captured and the captured one test object M is held at the position of the microwell 41, it is possible to reliably measure the fluorescence L2 emitted only from the captured one test object M.

Embodiment 3

A still another embodiment of the invention will be described as follows with reference to FIGS. 5 and 6. Note that, the present embodiment is the same as Embodiments 1 and 2 described above other than a configuration described in the present embodiment. For convenience of description, members having the same functions as those of the members illustrated in the figures of Embodiments 1 and 2 described above will be given the same reference signs and description thereof will be omitted.

In the fluorescent testing system 2 in Embodiment 2 described above, the capture layer 40 formed in a layered manner is provided on the upper side of the electrode embedding layer 15 in the silicon integrated circuit 10. On the other hand, a fluorescent testing system 3 in the present embodiment is different in that the capture layer 40 is formed so that a plurality of point-like protrusions or linear protrusions are arranged side by side.

A configuration of the fluorescent testing system 3 of the present embodiment will be described with reference to FIGS. 5(a), 5(b), 6(a), and 6(b). FIG. 5(a) is a plan view illustrating the configuration of the fluorescent testing system 3 of the present embodiment. FIG. 5(b) is a sectional view illustrating the configuration of the fluorescent testing system 3. FIG. 6(a) is a plan view illustrating a configuration of the fluorescent testing system 3 in a modified example of the present embodiment. FIG. 6(b) is a sectional view illustrating the configuration of the fluorescent testing system 3 in the modified example. Note that, in FIGS. 5(a), 5(b), 6(a), and 6(b), the transparent plate 21, the excitation light source 23, and the control unit 24 are omitted.

The fluorescent testing system 3 of the present embodiment is provided with the capture layer 40 on an upper surface of the electrode embedding layer 15 as illustrated in FIGS. 5(a) and 5(b), and the capture layer 40 is constituted by one in which columnar capture layers 42 as a plurality of point-like protrusions are arranged side by side in the present embodiment. In the present embodiment, each of the columnar capture layers 42 has a truncated cone shape in a vertical section as illustrated in FIG. 5(b). As a result, the columnar capture layers 42 appear to be a plurality of points in plan view as illustrated in FIG. 5(a).

That is, the capture layer 40 may have a property that the capture layer 40 tends to allow bonding to the test object M depending on a material of the capture layer 40. Therefore, when the capture layer 40 is formed in a layered manner on the upper side of the electrode embedding layer 15 as in Embodiment 2 described above, the test object M that flows is bonded to the capture layer 40 and hinders a flow of another test object M.

Thus, in the fluorescent testing system 3 of the present embodiment, by arranging the plurality of columnar capture layers 42 side by side, an area where the test object M contacts upper surfaces of the columnar capture layers 42 is reduced, so that contact of the test object M with an upper surface of the capture layer 40 is suppressed.

In this case, as illustrated in FIG. 5(b), a microwell 43 is formed as a recess having a shape in a vertical section in which an upper surface is enlarged in comparison with a lower surface in the capture layer 40 in accordance with a size of the test object M. A depth of the microwell 43 and a height of each of the columnar capture layers 42 may be a depth and a height at which one test object M flowing in the microfluidic channel 22 is able to be inserted and temporarily stop in the microwell 43, similarly to Embodiment 2. A part between columnar capture layers 42, which is a space that exists in a part other than the microwell 43, may have any size as long as the columnar capture layers 42 have an interval of an extent that the test object M does not stop.

As a result, in a case where a sphere cell that is the test object M is measured by using the fluorescent testing system 3 of the present embodiment, a contact surface on which the test object M contacts the upper surface of the columnar capture layer 42 is reduced. Thus, the test object M is difficult to be bonded to the upper surface of the columnar capture layer 42. Accordingly, in the fluorescent testing system 3 of the present embodiment, each test object M is able to be easily captured in each microwell 43 above each of the photodiodes 12 of the first photon detection unit 13a and the second photon detection unit 13b.

Thereby, it is possible that one test object M is reliably fitted and captured in the microwell 43 formed at the position of the photodiode 12 in plan view in the capture layer 40. Thus, only the fluorescence L2 emitted from the one test object M is able to be measured by the photodiode 12 by causing the fluorescence L2 to pass through the microwell 43.

Thus, since one test object M is easily captured and the captured one test object M is held at the position of the microwell 43, it is possible to reliably measure the fluorescence L2 emitted only from the captured one test object M.

Figure 5:
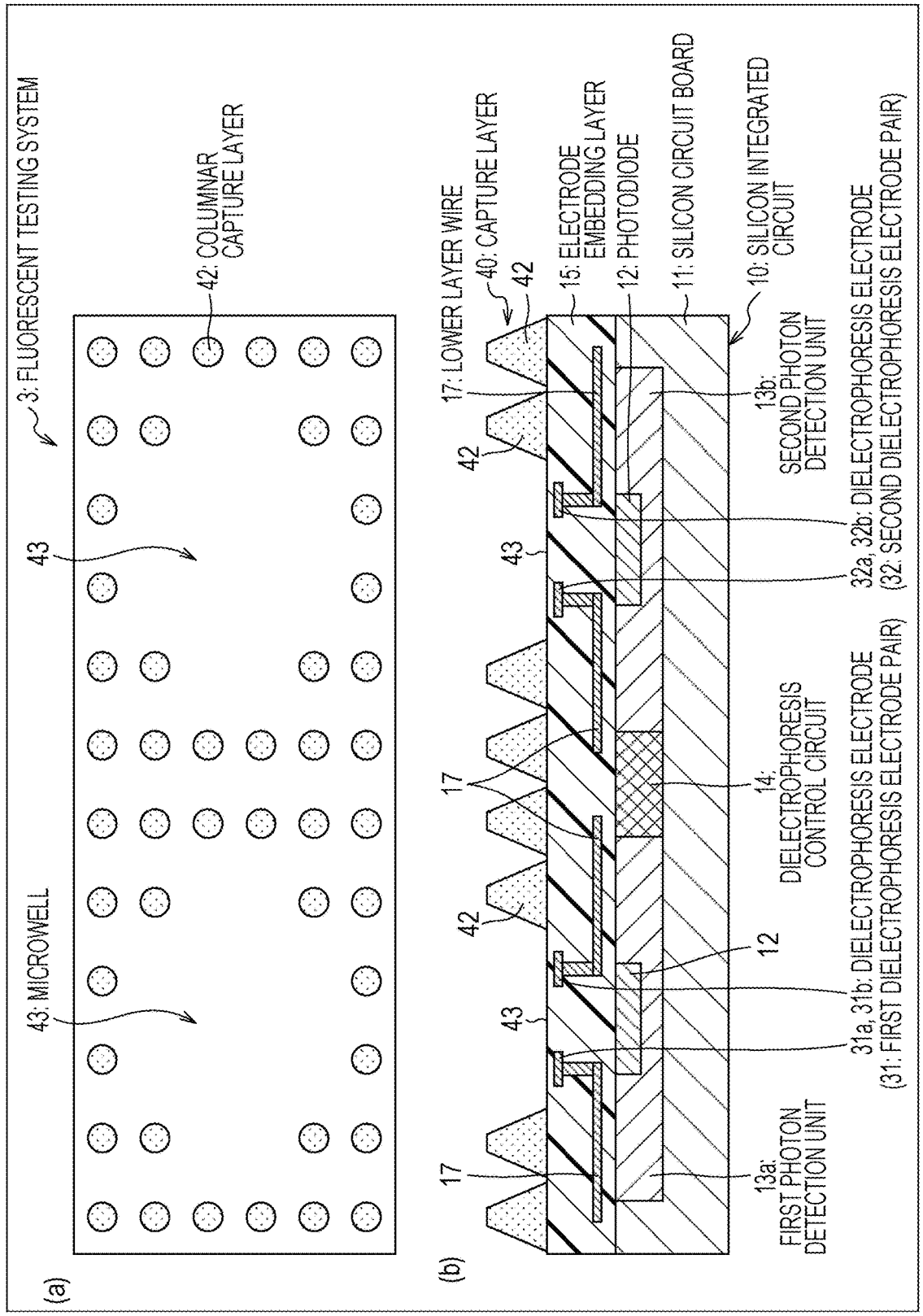
FIG. 5(a) illustrates a fluorescent testing system of Embodiment 3 of the invention and is a plan view illustrating a configuration of the fluorescent testing system and FIG. 5(b) is a sectional view illustrating the configuration of the fluorescent testing system.
Figure 6:
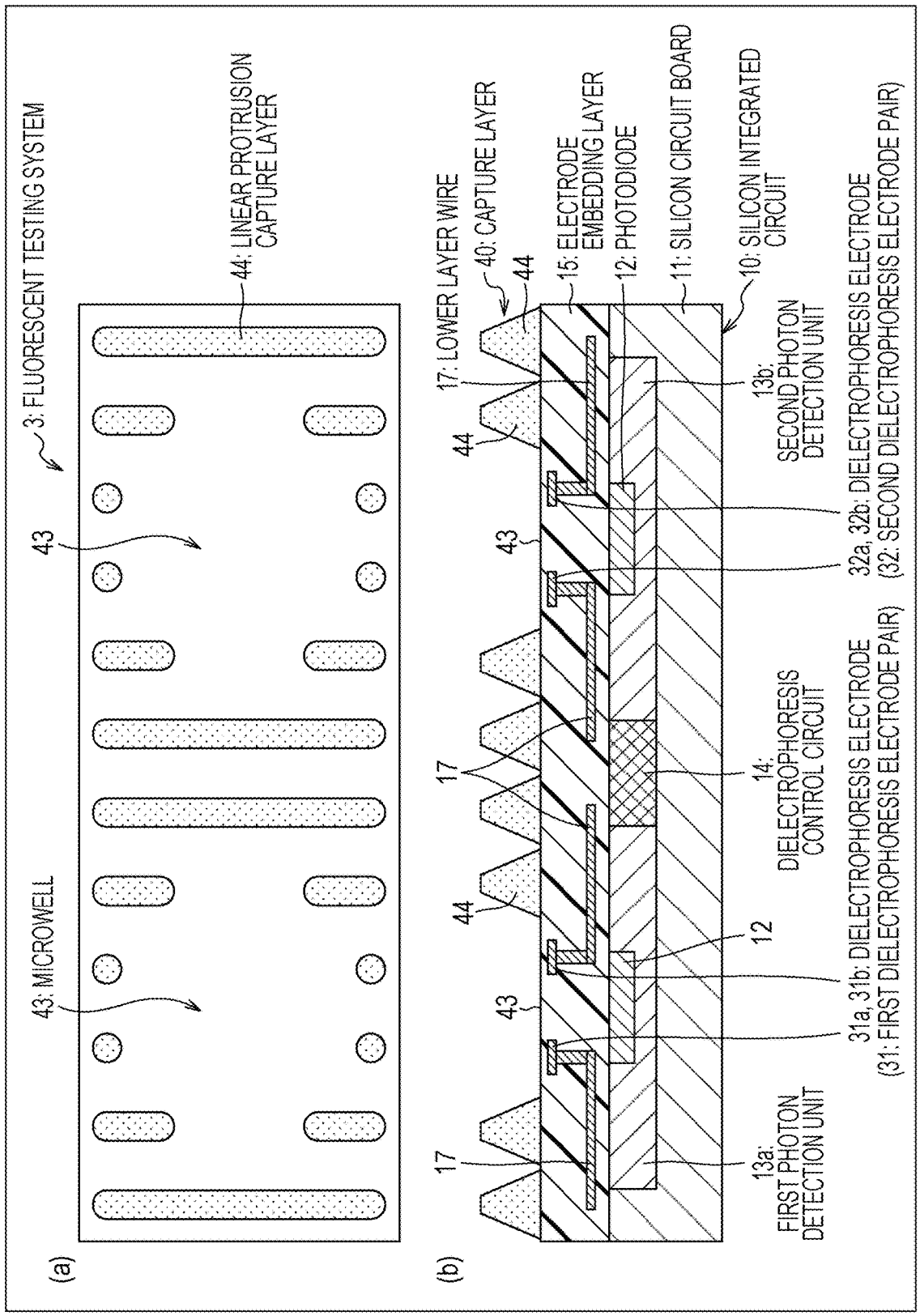
FIG. 6(a) illustrates the fluorescent testing system in a modified example of Embodiment 3 of the invention and is a plan view illustrating a configuration of the fluorescent testing system in the modified example and FIG. 6(b) is a sectional view illustrating the configuration of the fluorescent testing system in the modified example.

Note that, description has been given above by taking the columnar capture layers 42 as the plurality of point-like protrusions as illustrated in FIG. 5 as an example.

However, the capture layer 40 is not always limited to the columnar capture layers 42 as the plurality of point-like protrusions. For example, as illustrated in FIGS. 6(a) and 6(b), the capture layer 40 may be linear protrusion capture layers 44 constituted by a plurality of linear protrusions. Also in this case, an area where the test object M contacts upper surfaces of the linear protrusion capture layers 44 is reduced, so that a similar effect is achieved.

In this case, as illustrated in FIG. 6(a), a length of a line of the linear protrusion capture layers 44 may be short or long. In the present embodiment, as illustrated in FIG. 6(a), the linear protrusion capture layers 44 are provided to extend in a direction orthogonal to a flowing direction of the test object M. However, the linear protrusion capture layers 44 according to an aspect of the invention is not always limited thereto and may be provided to extend in a direction parallel to the flowing direction of the test object M.

In this manner, in the fluorescent testing system 3 of the present embodiment, the capture layer 40 is formed so that the columnar capture layers 42 as the plurality of point-like protrusions or the linear protrusion capture layers 44 as the linear protrusions are arranged side by side. Thereby, an area where the capture layer 40 contacts the test object M is reduced, so that the test object M is difficult to be bonded to the capture layer 40. As a result, a case where the test object M flowing in the flow channel is bonded to the capture layer 40 and electrophoresis of the test object M is hindered is suppressed.

Embodiment 4

Figure 7:
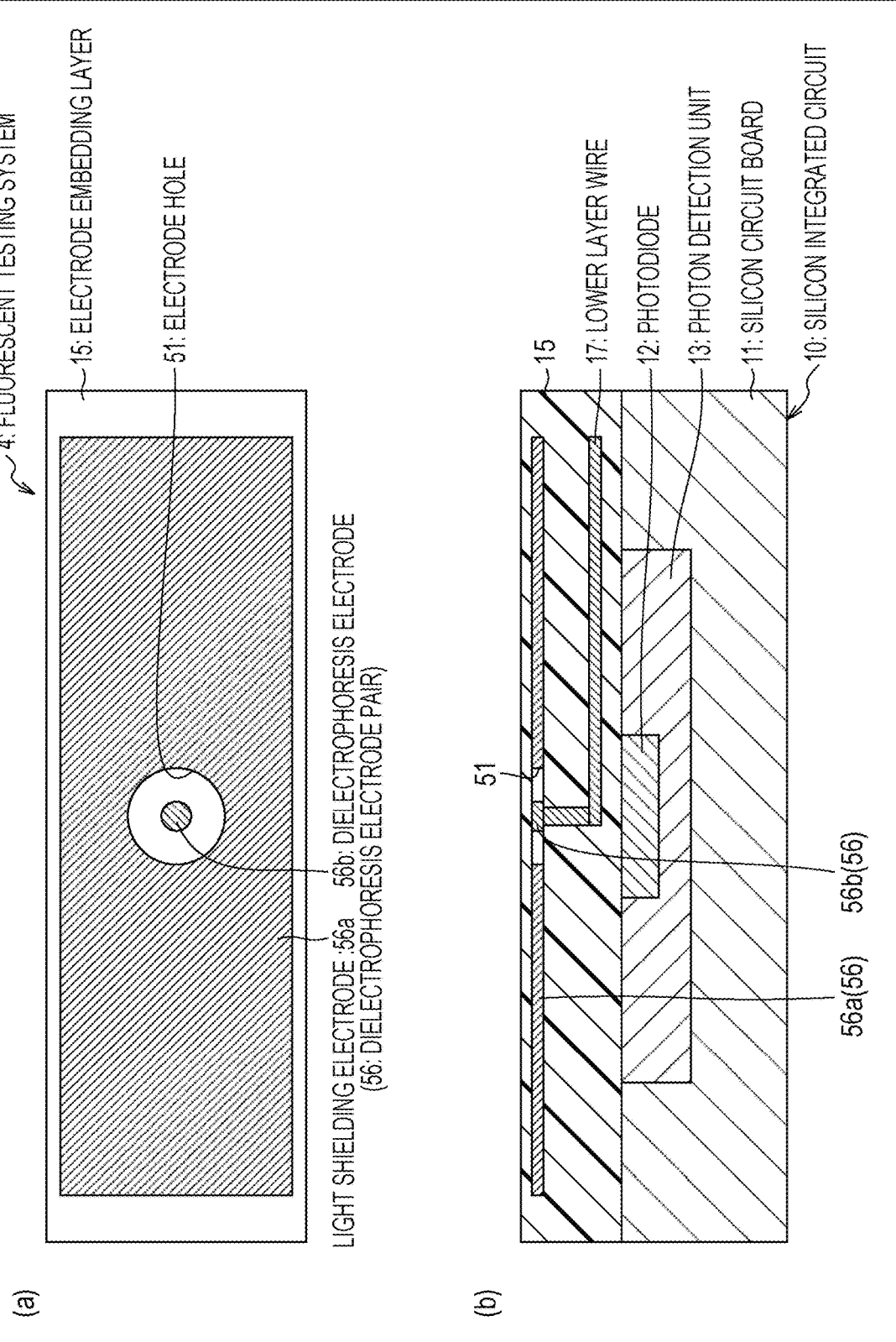
FIG. 7(a) illustrates a fluorescent testing system of Embodiment 4 of the invention and is a plan view illustrating a configuration of the fluorescent testing system and FIG. 7(b) is a sectional view illustrating the configuration of the fluorescent testing system.
Figure 8:
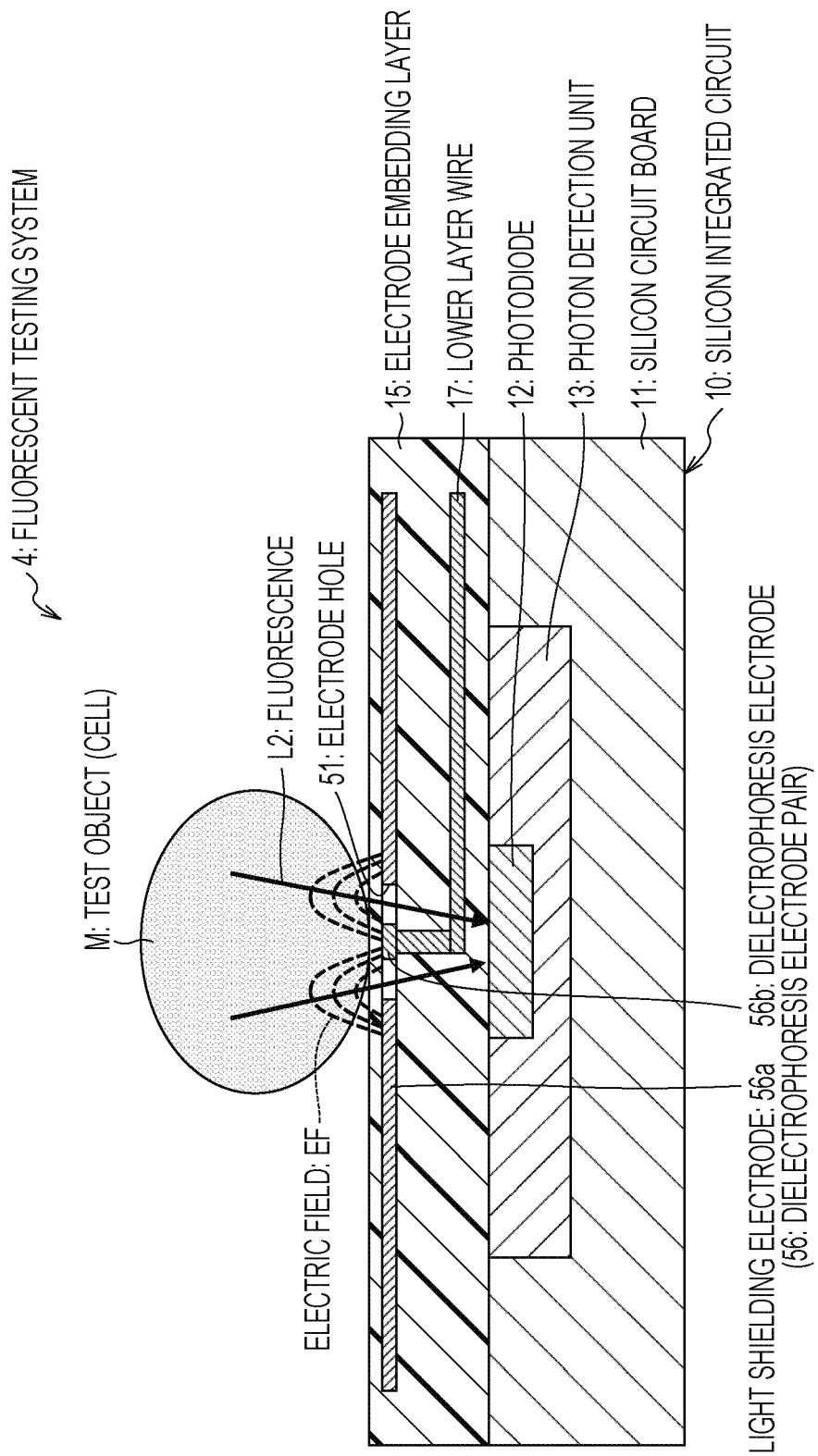
FIG. 8 illustrates a measurement operation in the fluorescent testing system and is a sectional view illustrating a state where a cell that is a test object is captured by an electrode pair.

A still another embodiment of the invention will be described as follows with reference to FIGS. 7 and 8. Note that, the present embodiment is the same as Embodiments 1, 2, and 3 described above other than a configuration described in the present embodiment. For convenience of description, members having the same functions as those of the members illustrated in the figures of Embodiments 1, 2, and 3 described above will be given the same reference signs and description thereof will be omitted.

In the fluorescent testing systems 1, 2, and 3 of Embodiments 1, 2, and 3 described above, the dielectrophoresis electrode pair 16, the first dielectrophoresis electrode pair 31, and the second dielectrophoresis electrode pair 32 are respectively constituted by the dielectrophoresis electrodes 16a and 16b that have the same shape, the dielectrophoresis electrodes 31a and 31b that have the same shape, and the dielectrophoresis electrodes 32a and 32b that have the same shape. On the other hand, a fluorescent testing system 4 of the present embodiment is different in that, as illustrated in FIGS. 7(a) and 7(b), a dielectrophoresis electrode pair 56 has one dielectrophoresis electrode constituted by a light shielding electrode 56a formed in a planar shape and has the other dielectrophoresis electrode 56b constituted by an electrode formed in a hole of the light shielding electrode 56a.

First, in the fluorescent testing systems 1, 2, and 3 of Embodiments 1, 2, and 3 described above, the dielectrophoresis electrode pair 16, the first dielectrophoresis electrode pair 31, and the second dielectrophoresis electrode pair 32 are respectively constituted by the dielectrophoresis electrodes 16a and 16b that have the same shape, the dielectrophoresis electrodes 31a and 31b that have the same shape, and the dielectrophoresis electrodes 32a and 32b that have the same shape, each of which is formed in a part of a region of a plane of the electrode embedding layer 15. Thus, an upper side of the photon detection unit 13 is in an open state and stray light by external light is incident on the photodiode 12. The stray light by external light is light other than the fluorescence L2 from the test object M and gives a bad influence on detection accuracy of the photon detection unit 13.

Thus, the fluorescent testing system 4 of the present embodiment has the following configuration in order that stray light other than the fluorescence emitted from the test object M is prevented from being incident as described above.

(Configuration of Fluorescent Testing System)

A configuration of the fluorescent testing system 4 of the present embodiment will be described with reference to FIGS. 7(a) and 7(b). FIG. 7(a) is a plan view illustrating the configuration of the fluorescent testing system 4 of the present embodiment. FIG. 7(b) is a sectional view illustrating the configuration of the fluorescent testing system 4. Note that, in FIGS. 7(a) and 7(b), the transparent plate 21, the excitation light source 23, and the control unit 24 are omitted.

In the fluorescent testing system 4 of the present embodiment, as illustrated in FIGS. 7(a) and 7(b), one dielectrophoresis electrode of the dielectrophoresis electrode pair 56 is constituted by the light shielding electrode 56a that is formed in the planar shape. The light shielding electrode 56a covers a substantially entire surface of the electrode embedding layer 15 and an electrode hole 51 constituted by a circular through hole is formed at a position above the photodiode 12.

In the fluorescent testing system 4 of the present embodiment, the other dielectrophoresis electrode 56b of the dielectrophoresis electrode pair 56 is provided so as to be positioned in a center of the electrode hole 51.

The lower layer wire 17 is connected to the dielectrophoresis electrode 56b and the other end of the lower layer wire 17 is connected to a power source that is not illustrated. On the other hand, the light shielding electrode 56a is connected to the power source that is not illustrated through a wire that is not illustrated.

That is, though various methods of shielding light in the upper side of the photodiode 12 are considered, in the fluorescent testing system 4 of the present embodiment, the light shielding electrode 56a shields light in a part other than the electrode hole 51 for incidence of the fluorescence on the upper side of the photodiode 12. In this manner, in the present embodiment, one dielectrophoresis electrode of the dielectrophoresis electrode pair 56 is used as the light shielding electrode 56a for light shielding. Thereby, a structure of the dielectrophoresis electrode pair 56 and wiring thereof are simplified and a pitch of the photon detection unit 13 to be integrated is able to be made finer.

(Measurement Operation of Fluorescent Testing System)

A measurement operation in the fluorescent testing system 4 having the configuration described above will be described with reference to FIG. 8. FIG. 8 illustrates the measurement operation in the fluorescent testing system 4 and is a sectional view illustrating a state where a cell that is the test object M is captured by the dielectrophoresis electrode pair 56. Note that, in FIG. 8, the transparent plate 21, the excitation light source 23, and the control unit 24 are omitted.

In the fluorescent testing system 4 having the configuration described above, as illustrated in FIG. 8, when a voltage is applied from the power source that is not illustrated to the light shielding electrode 56a and the dielectrophoresis electrode 56b, the electric field EF is generated between the light shielding electrode 56a and the dielectrophoresis electrode 56b. Thereby, the cell that is the test object M is in a state of being captured by the electrode hole 51.

At this time, the control unit 24 performs control to drive the excitation light source 23 and the photon detection unit 13. As a result, the excitation light source 23 radiates the excitation light L1 in the pulsed manner between the light shielding electrode 56a and the dielectrophoresis electrode 56b for a short time, so that the fluorescent marker FM of the cell that is the test object M absorbs the excitation light L1 from the excitation light source 23. Thereby, the fluorescent marker FM of the cell emits the fluorescence L2. At this time, since the excitation light source 23 radiates the excitation light L1 in the pulsed manner, the excitation light L1 is sometimes extinguished. Thereby, the photon detection unit 13 receives the fluorescence L2 and detects the fluorescence L2. Here, in the fluorescent testing system 4 of the present embodiment, an upper surface of the photon detection unit 13 is covered with the light shielding electrode 56a.

As a result, stray light such as external light is less likely to be incident from the electrode hole 51 and only the fluorescence L2 is incident on the photodiode 12.

Thus, it is possible to suppress incidence of stray light such as external light and obtain a highly accurate test result.

In this manner, in the fluorescent testing system 4 of the present embodiment, the light shielding electrode 56a that is one of the electrodes of the dielectrophoresis electrode pair 56 is arranged at a position where light is shielded in a part other than a part above a center part of the photodiode 12.

Thereby, above the photodiode 12, the light shielding electrode 56a that is one of the electrodes of the dielectrophoresis electrode pair 56 is used to shield the light in the part other than the part above the center part of the photodiode 12. As a result, an increase in the number of components is avoided and it is possible to prevent external light and stray light by the fluorescence L2 from other than the test object M from being incident on the photodiode 12 from the part other than the part above the center part of the photodiode 12.

Thus, a highly accurate test result is able to be obtained and it is possible to provide the fluorescent testing system 4 that is highly reliable.

Embodiment 5

A still another embodiment of the invention will be described as follows with reference to FIG. 9.

A fluorescent testing system 5 of the present embodiment is different in that an electrode pair for high electric field application 61 is provided in addition to the configuration of the fluorescent testing systems 1 to 4 of Embodiments 1 to 4 described above.

A configuration of the fluorescent testing system 5 of the present embodiment will be described with reference to FIG. 9. FIG. 9 is a sectional view illustrating the configuration of the fluorescent testing system 5 in the present embodiment.

Figure 9:
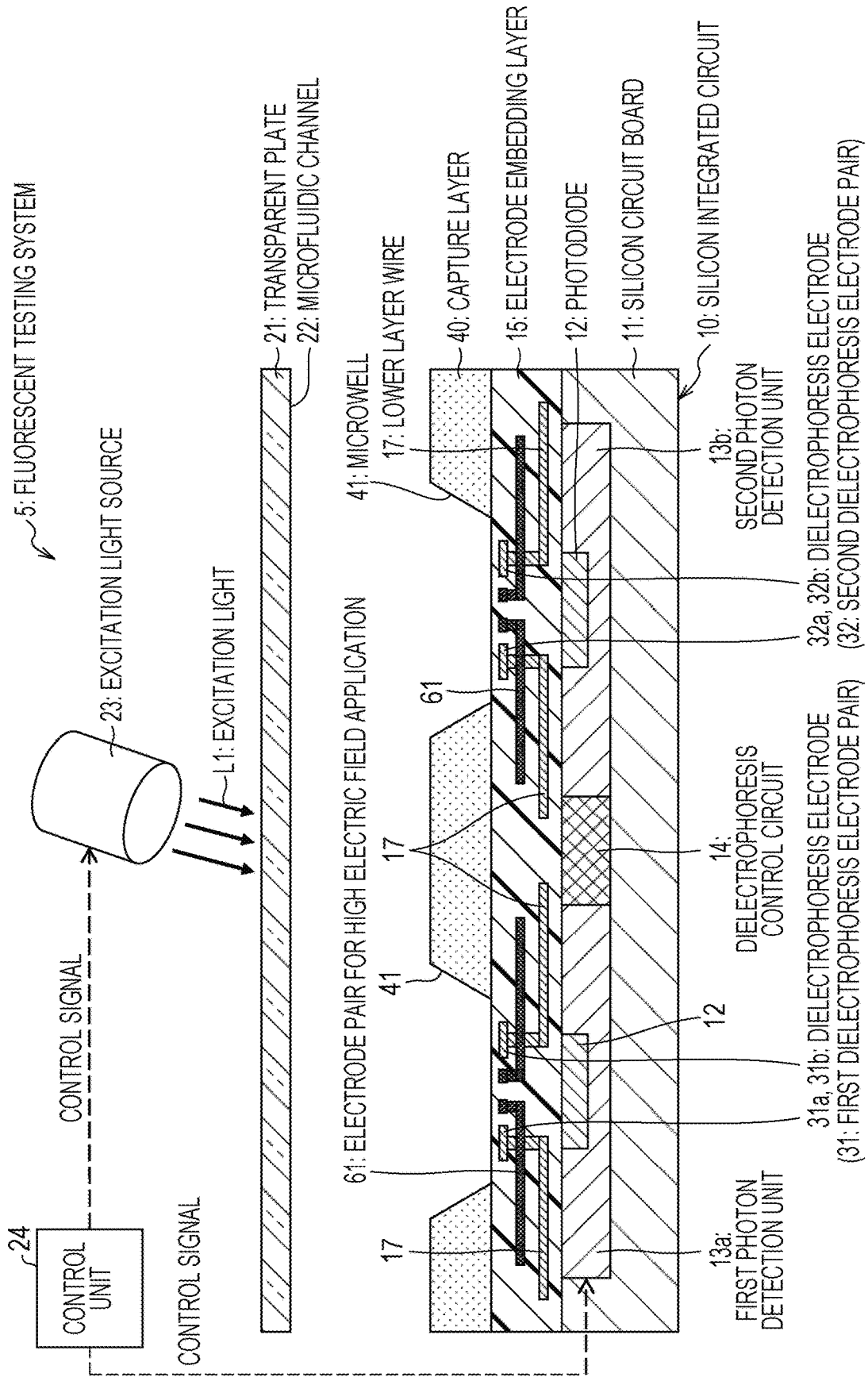
FIG. 9 illustrates a configuration of a fluorescent testing system in Embodiment 5 of the invention and is a sectional view illustrating the configuration of the fluorescent testing system.

In the fluorescent testing system 5 of the present embodiment, as illustrated in FIG. 9, in addition to the configuration of the fluorescent testing system 2 of Embodiment 2 described above, the electrode embedding layer 15 is provided with electrode pairs for high electric field application 61 and 61 above the photodiodes 12. A high electric field applied by each of the electrode pairs for high electric field application 61 and 61 has a pulse voltage of, for example, 0.1 to 10 kV/mm.

In the fluorescent testing system 5, detection of fluorescence is able to be performed by breaking a cell membrane of the cell that is captured in the microwell 41 by dielectrophoresis and adding a fluorescent label to a gene in the cell. As a result, it is possible to analyze the cell in more detail.

Note that, in the present embodiment, the configuration in which the electrode pairs for high electric field application 61 and 61 are added to the fluorescent testing system 2 of Embodiment 2 described above has been described. However, the invention is not always limited thereto, and the electrode pairs for high electric field application 61 and 61 are also able to be added to, for example, the fluorescent testing system 1 of Embodiment 1 described above, the fluorescent testing system 3 of Embodiment 3 described above, or the fluorescent testing system 4 of Embodiment 4 described above.

Embodiment 6

A still another embodiment of the invention will be described as follows with reference to FIG. 10.

A fluorescent testing method of the present embodiment aims that detection of specific protein is performed by using the fluorescent testing system 2 illustrated in Embodiment 2 with higher sensitivity and higher accuracy in comparison with a ELISA method of the related art.

The fluorescent testing method of the present embodiment will be described with reference to FIG. 10. FIG. 10 is a sectional view illustrating the fluorescent testing system for explaining the fluorescent testing method of the present embodiment.

Figure 10:
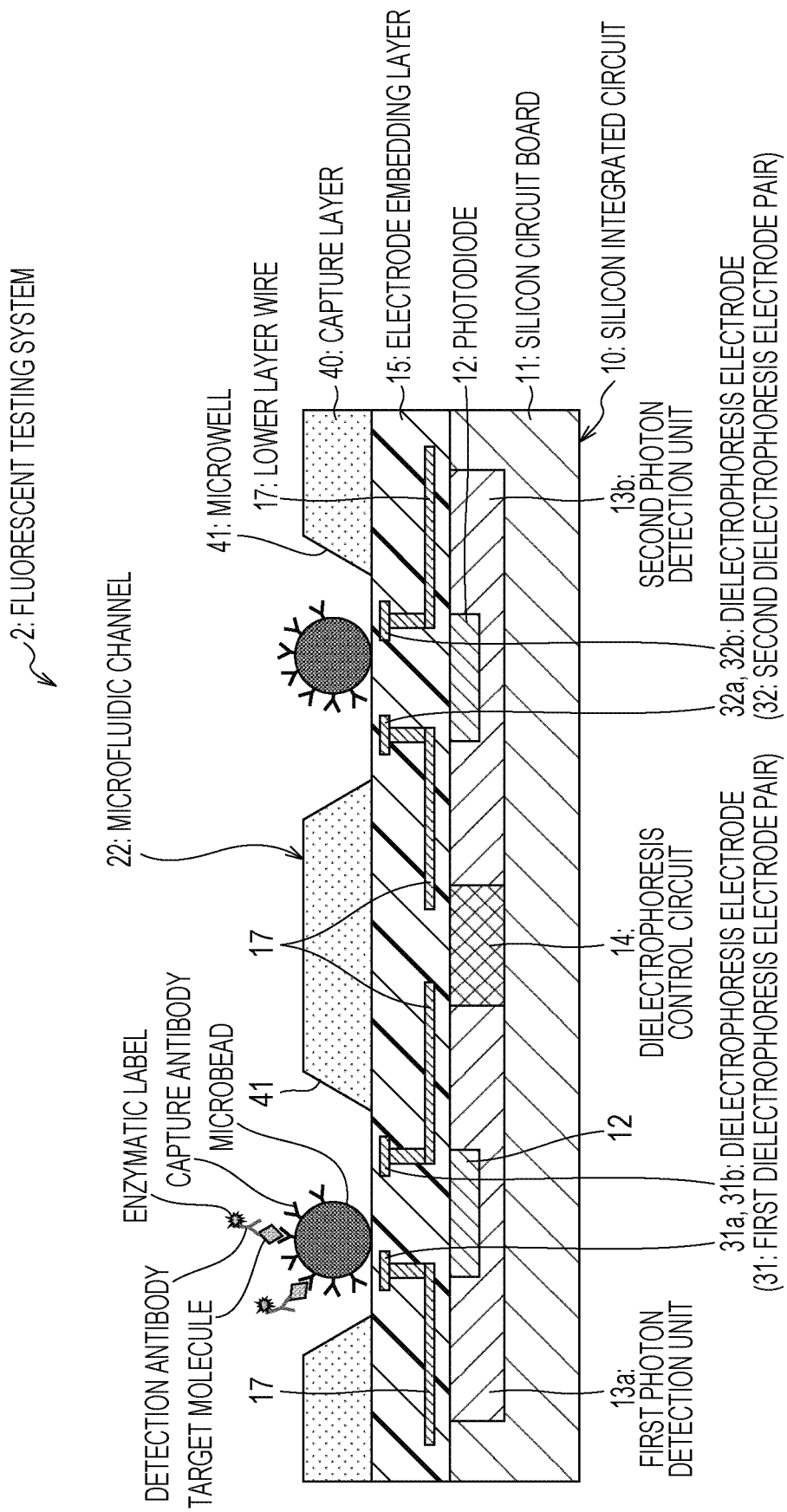
FIG. 10 illustrates a configuration of a fluorescent testing system in Embodiment 6 of the invention and is a sectional view illustrating the configuration of the fluorescent testing system.

The fluorescent testing method of the present embodiment uses the fluorescent testing system 2 indicated in Embodiment 2 as illustrated in FIG. 10.

Specifically, a microbead having a capture antibody is mixed with a detection antibody and a target molecule that is captured is further combined with the detection antibody. The detection antibody is labeled in advance by an enzymatic label, for example, such as alkaline phosphatase (AP), horseradish peroxidase (HRP), or β-galactosidase.

Solution thereof is caused to flow in the microfluidic channel 22 and the microbead is captured above the first dielectrophoresis electrode pair 31 and the second dielectrophoresis electrode pair 32 by dielectrophoresis. Next, when a fluorescent substrate that is not illustrated is caused to flow in the microfluidic channel 22, the fluorescent substrate reacts with the enzymatic label to generate a fluorescent material that is not illustrated. As a result, fluorescence is detected from a microbead capturing a target molecule, and the number of target molecules is estimated from the number of photodiodes 12 in which the fluorescence is detected.

Since the generation of the fluorescent material is performed in a limited region of the microwell 41, the fluorescence is generated intensively on the photodiode 12 and the detection is able to be performed even when the number of target molecules is small.

Such a detection method of the related art has been performed by using a fluorescent microscope, however, according to the present embodiment, neither fluorescent microscope nor image processing of a captured image thereof is necessary.

In this manner, a molecular testing method in the present embodiment is a molecular testing method using the fluorescent testing system 2 of the present embodiment, and includes a first step of mixing a microbead having a capture antibody with a detection antibody, further combining a captured target molecule with the detection antibody, and causing solution, which includes the microbead, to flow in the microfluidic channel 22 of the fluorescent testing system 2, a second step of capturing, by dielectrophoresis in the fluorescent testing system 2, the microbead in the microwell 41 of the capture layer 40 formed above the first dielectrophoresis electrode pair 31 and the second dielectrophoresis electrode pair 32, a third step of causing a fluorescent substrate to flow in the microfluidic channel 22, and a fourth step of detecting, by the fluorescent testing system 2, a fluorescent material generated when the fluorescent substrate reacts with an enzymatic label.

Thereby, since the generation of the fluorescent material is performed in a limited region of the microwell 41 as the through hole, the fluorescence is generated intensively on the photodiode 12 and the detection is able to be performed even when the number of target molecules is small. As a result, it is possible to achieve a simple molecular testing method.

Embodiment 7

Figure 11:
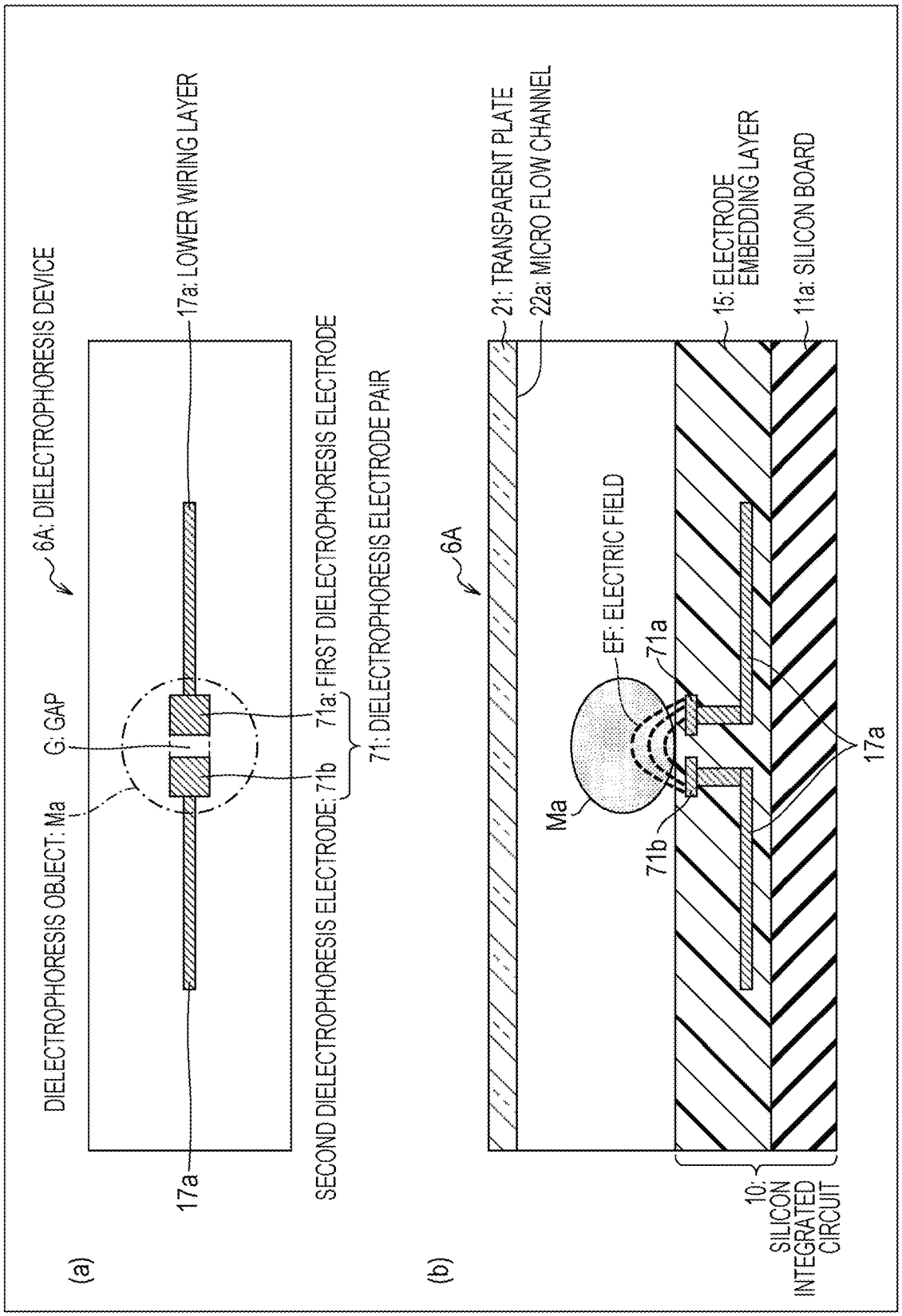
FIG. 11(a) illustrates a dielectrophoresis device in Embodiment 7 of the invention and is a plan view illustrating a configuration of the dielectrophoresis device and FIG. 11(b) is a sectional view illustrating the configuration of the dielectrophoresis device.

A still another embodiment of the invention will be described as follows with reference to FIG. 11.
(Configuration of Dielectrophoresis Device)

A configuration of a dielectrophoresis device 6A of the present embodiment will be described with reference to FIGS. 11(a) and 11(b). FIG. 11(a) is a plan view illustrating a configuration of the dielectrophoresis device 6A of the present embodiment. FIG. 11(b) is a sectional view illustrating the configuration of the dielectrophoresis device 6A of the present embodiment.

As illustrated in FIGS. 11(a) and 11(b), the dielectrophoresis device 6A of the present embodiment includes the silicon integrated circuit 10 formed with the electrode embedding layer 15 laminated on a silicon board 11a, and the transparent plate 21 provided above the silicon board 11a. A micro flow channel 22a in which a dielectrophoresis object Ma as a capture material flows is formed between the electrode embedding layer 15 and the transparent plate 21. The dielectrophoresis object Ma is, for example, a cell or the like.

The silicon board 11a in the silicon integrated circuit 10 is constituted by a board made from silicon (Si).

In the electrode embedding layer 15 of the silicon integrated circuit 10, a dielectrophoresis electrode pair 71 constituted by a first dielectrophoresis electrode 71a and a second dielectrophoresis electrode 71b to generate an electric field for dielectrophoresis is embedded and a lower wiring layer 17a that is connected to the first dielectrophoresis electrode 71a and the second dielectrophoresis electrode 71b to guide a voltage to the first dielectrophoresis electrode 71a and the second dielectrophoresis electrode 71b is embedded. The lower wiring layer 17a is provided to be lower than the first dielectrophoresis electrode 71a and the second dielectrophoresis electrode 71b in the electrode embedding layer 15 in the present embodiment.

The electrode embedding layer 15 serves as, for example, a transparent resin layer to indicate an existence of the dielectrophoresis electrode pair 71.

In the dielectrophoresis electrode pair 71, when the voltage is applied to the first dielectrophoresis electrode 71a and the second dielectrophoresis electrode 71b through the lower wiring layer 17a, the electric field EF is generated between the first dielectrophoresis electrode 71a and the second dielectrophoresis electrode 71b, and when the dielectrophoresis object Ma passes through the electric field EF, the dielectrophoresis object Ma is captured by dielectrophoresis.

Sizes of the first dielectrophoresis electrode 71a and the second dielectrophoresis electrode 71b are the same in the present embodiment.

Meanwhile, such a kind of dielectrophoresis device of the related art has a problem that a plurality of dielectrophoresis objects Ma flowing in the micro flow channel 22a are captured by the dielectrophoresis electrode pair 71, and therefore, when the dielectrophoresis electrode pair 71 is a target subjected to any test, for example, measurement of a single dielectrophoresis object Ma is hindered. There is also a problem that the plurality of dielectrophoresis objects Ma captured by the dielectrophoresis electrode pair 71 hinder a flow of another dielectrophoresis object Ma flowing in the micro flow channel 22a.

Figure 19:
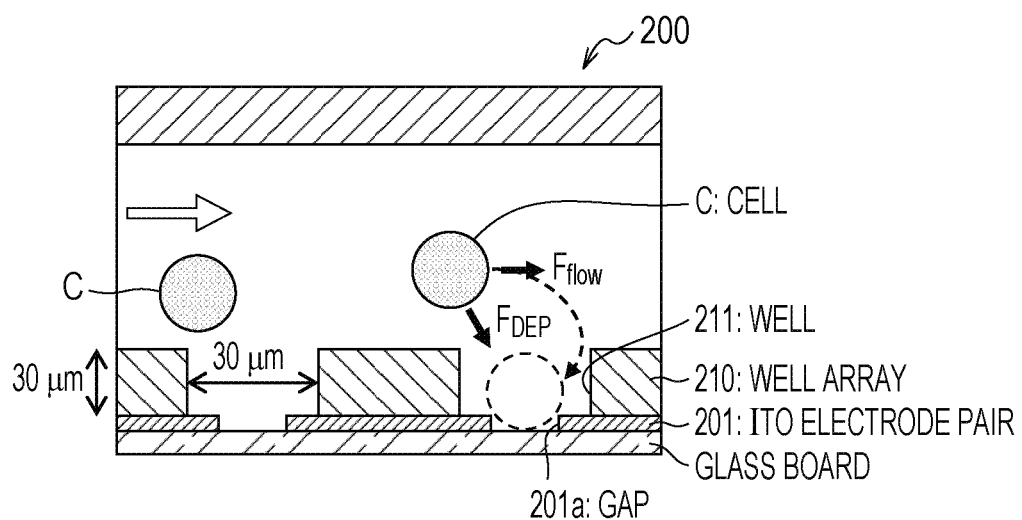
FIG. 19 is a sectional view illustrating a configuration of another dielectrophoresis device of the related art.

Thus, in a dielectrophoresis device 200 disclosed in NPL 1, for example, as illustrated in FIG. 19, a well array 210 having a well 211 is provided on an ITO electrode pair 201 to form a structure where individual cells C are separated from each other.

However, such formation of the well array 210 hinders a flow of a cell C near the ITO electrode pair 201 that is a dielectrophoresis electrode pair and deteriorates efficiency of capturing the cell C.

Figure 20:
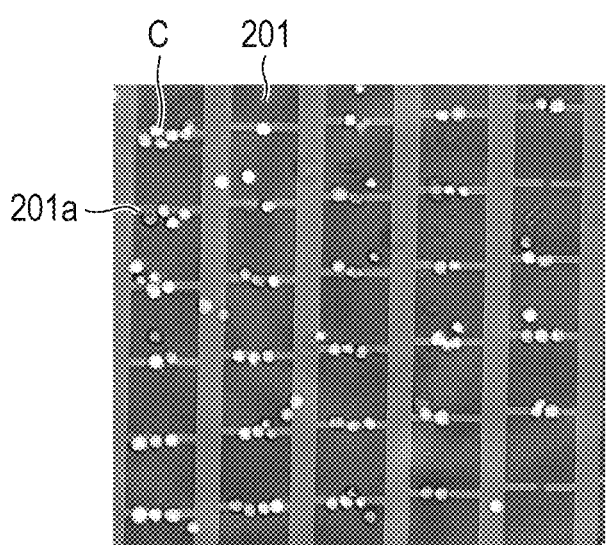
FIG. 20 is a plan view illustrating a state where a cell is captured by the dielectrophoresis device.

Here, also when a size of a gap 201a of the ITO electrode pair 201 is set to be equal to or less than a size of the cell C and a place where the electric field is strong is locally provided, a plurality of cells C are captured on the ITO electrode pair 201 around the gap 201a as illustrated in FIG. 20.

The reason why the cells C are captured around the gap 201a as illustrated in FIG. 21 is that a place where the electric field is strong is provided not only in the gap 201a but also along the ITO electrode pair 201 extending around the gap 201a.

Thus, in the dielectrophoresis device 6A of the present embodiment, the dielectrophoresis electrode pair 71 is constituted by the first dielectrophoresis electrode 71a and the second dielectrophoresis electrode 71b, and a region including at least the first dielectrophoresis electrode 71a and the gap G between the first dielectrophoresis electrode 71a and the second dielectrophoresis electrode 71b is formed so as to be covered with one dielectrophoresis object Ma.

As a result, only one dielectrophoresis object Ma is captured by the dielectrophoresis electrode pair 71. Thereby, there is no case where retaining of the plurality of dielectrophoresis objects Ma hinders a flow of another dielectrophoresis object Ma that flows in the micro flow channel 22a.

Thus, it is possible to provide the dielectrophoresis device 6A that is able to prevent the plurality of dielectrophoresis objects Ma from being captured and prevent a flow of the dielectrophoresis object Ma from being hindered near the dielectrophoresis electrode pair 71.

Embodiment 8

Figure 12:
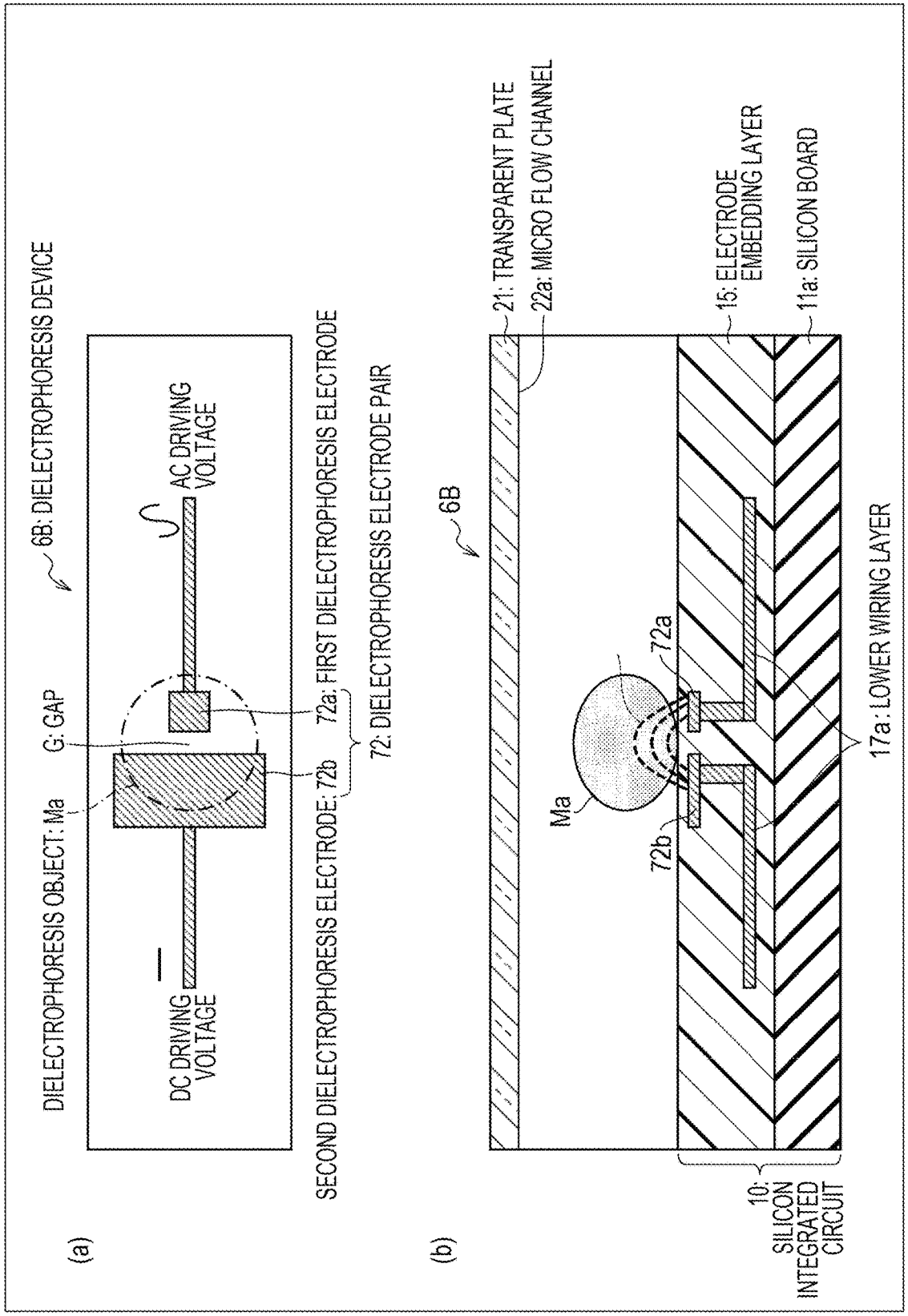
FIG. 12(a) illustrates a dielectrophoresis device in Embodiment 8 of the invention and is a plan view illustrating a configuration of the dielectrophoresis device and FIG. 12(b) is a sectional view illustrating the configuration of the dielectrophoresis device.

A still another embodiment of the invention will be described as follows with reference to FIG. 12. Note that, the present embodiment is the same as Embodiment 7 described above other than a configuration described in the present embodiment. For convenience of description, members having the same functions as those of the members illustrated in the figure of Embodiment 7 described above will be given the same reference signs and description thereof will be omitted.

The first dielectrophoresis electrode 71a and the second dielectrophoresis electrode 71b in the dielectrophoresis electrode pair 71 of the dielectrophoresis device 6A of Embodiment 7 described above have the same shapes. On the other hand, a first dielectrophoresis electrode 72a and a second dielectrophoresis electrode 72b in a dielectrophoresis electrode pair 72 of a dielectrophoresis device 6B of the present embodiment are different not only in size and shape but also in voltage to be applied.

A configuration of the dielectrophoresis device 6B of the present embodiment will be described with reference to FIGS. 12(a) and 12(b). FIG. 12(a) illustrates the dielectrophoresis device 6B in the present embodiment and is a plan view illustrating the configuration of the dielectrophoresis device 6B. FIG. 12(b) is a sectional view illustrating the configuration of the dielectrophoresis device 6B.

In the dielectrophoresis device 6B of the present embodiment, as illustrated in FIGS. 12(a) and 12(b), the electrode embedding layer 15 is provided with the dielectrophoresis electrode pair 72 constituted by the first dielectrophoresis electrode 72a and the second dielectrophoresis electrode 72b. Lower wiring layers 17a and 17a are respectively connected to the first dielectrophoresis electrode 72a and the second dielectrophoresis electrode 72b. The dielectrophoresis electrode pair 72 is formed by a highest layer of multilayer wiring layers and a wire for applying the voltage to the dielectrophoresis electrode pair 72 is formed by using the lower wiring layers 17a.

In the present embodiment, while an alternating-current voltage that is a variable potential is applied to the lower wiring layer 17a of the first dielectrophoresis electrode 72a, a direct-current voltage that is a fixed potential is applied to the lower wiring layer 17a of the second dielectrophoresis electrode 72b.

Here, the first dielectrophoresis electrode 72a and the second dielectrophoresis electrode 72b of the dielectrophoresis electrode pair 72 of the present embodiment are different from each other in size and shape. Specifically, the first dielectrophoresis electrode 72a has, for example, a small square shape. On the other hand, the second dielectrophoresis electrode 72b has, for example, a large rectangular shape.

That is, in the present embodiment, as illustrated in FIGS. 12(a) and 12(b), the smaller first dielectrophoresis electrode 72a on a right side is driven by the AC voltage and the larger second dielectrophoresis electrode 72b on a left side is driven by the DC voltage.

In the dielectrophoresis device 6B of the present embodiment, the dielectrophoresis object Ma, for example, such as a cell is drawn by dielectrophoresis to a part where the electric field is strong. Thus, in a case of the dielectrophoresis electrode pair 72 illustrated in FIGS. 12(a) and 12(b) of the present embodiment, the electric field is maximized at each end surface of the first dielectrophoresis electrode 72a and the second dielectrophoresis electrode 72b that face the gap G. Also around each of the first dielectrophoresis electrode 72a and the second dielectrophoresis electrode 72b, a region where the electric field is slightly strong is formed. In particular, the electric field is strong at the end surface of the first dielectrophoresis electrode 72a on the right side, which is driven by the alternating-current voltage, and around the electrode.

Thus, the dielectrophoresis electrode pair 72 of the dielectrophoresis device 6B of the present embodiment is arranged so that the first dielectrophoresis electrode 72a illustrated on the right in FIGS. 12(a) and 12(b) and the gap G are covered with the dielectrophoresis object Ma subjected to dielectrophoresis.

Thereby, when one dielectrophoresis object Ma is captured by the dielectrophoresis electrode pair 72, the part where the electric field is strong is covered with the dielectrophoresis object Ma, so that no more dielectrophoresis objects Ma is captured.

In this manner, the dielectrophoresis device 6B of the present embodiment is formed so that the first dielectrophoresis electrode 72a, the gap G, and a part of the second dielectrophoresis electrode 72b are covered with one dielectrophoresis object Ma and the variable potential is applied to the first dielectrophoresis electrode 72a.

Thereby, when one dielectrophoresis object Ma is captured, the first dielectrophoresis electrode 72a that is the part where the electric field is strong is covered with the dielectrophoresis object Ma, thus making is possible to prevent more dielectrophoresis objects Ma from being captured.

Embodiment 9

Figure 13:
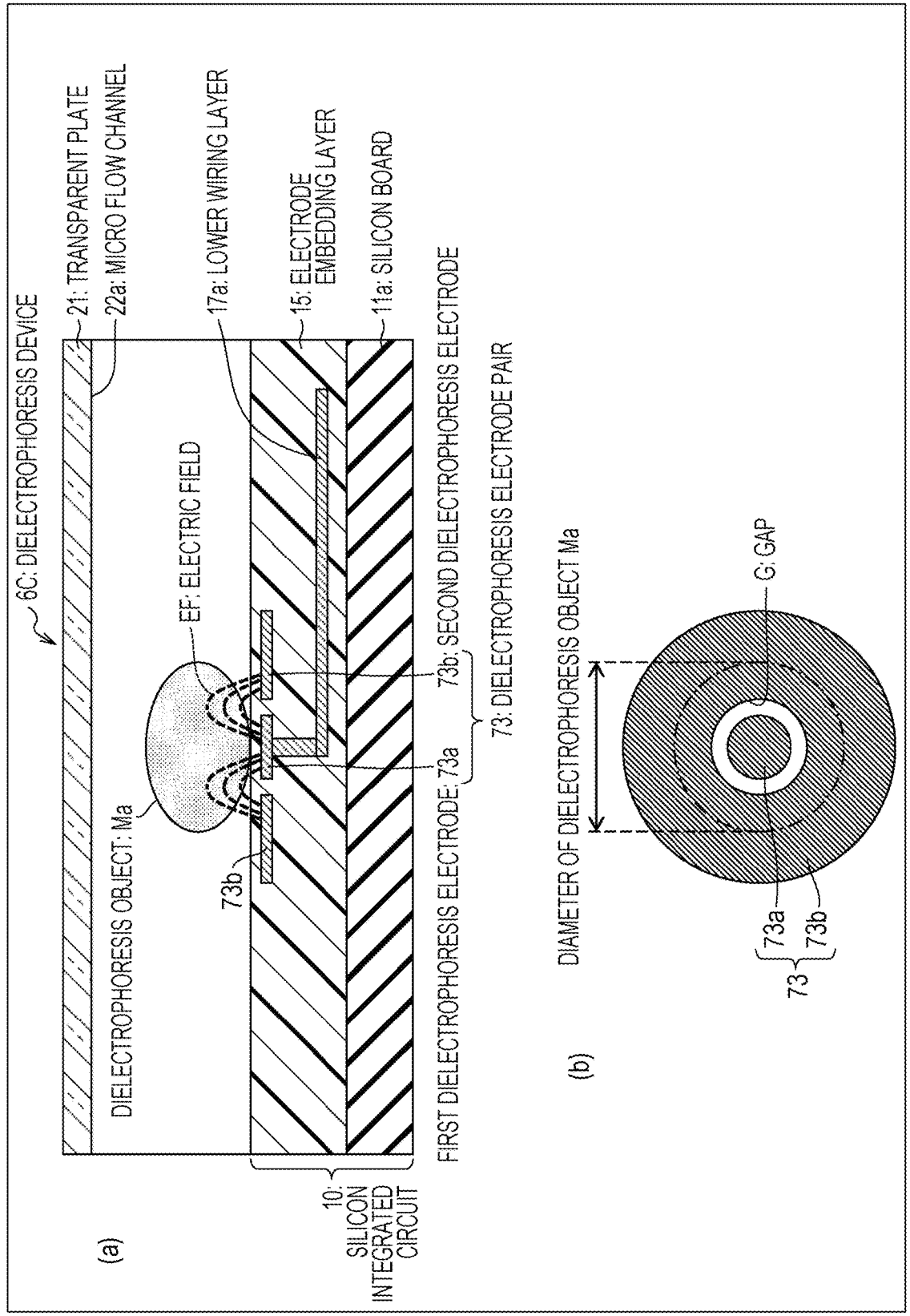
FIG. 13(a) illustrates a dielectrophoresis device in Embodiment 9 of the invention and is a sectional view illustrating a configuration of the dielectrophoresis device and FIG. 13(b) is a plan view illustrating the configuration of a dielectrophoresis electrode pair of the dielectrophoresis device.
Figure 15:
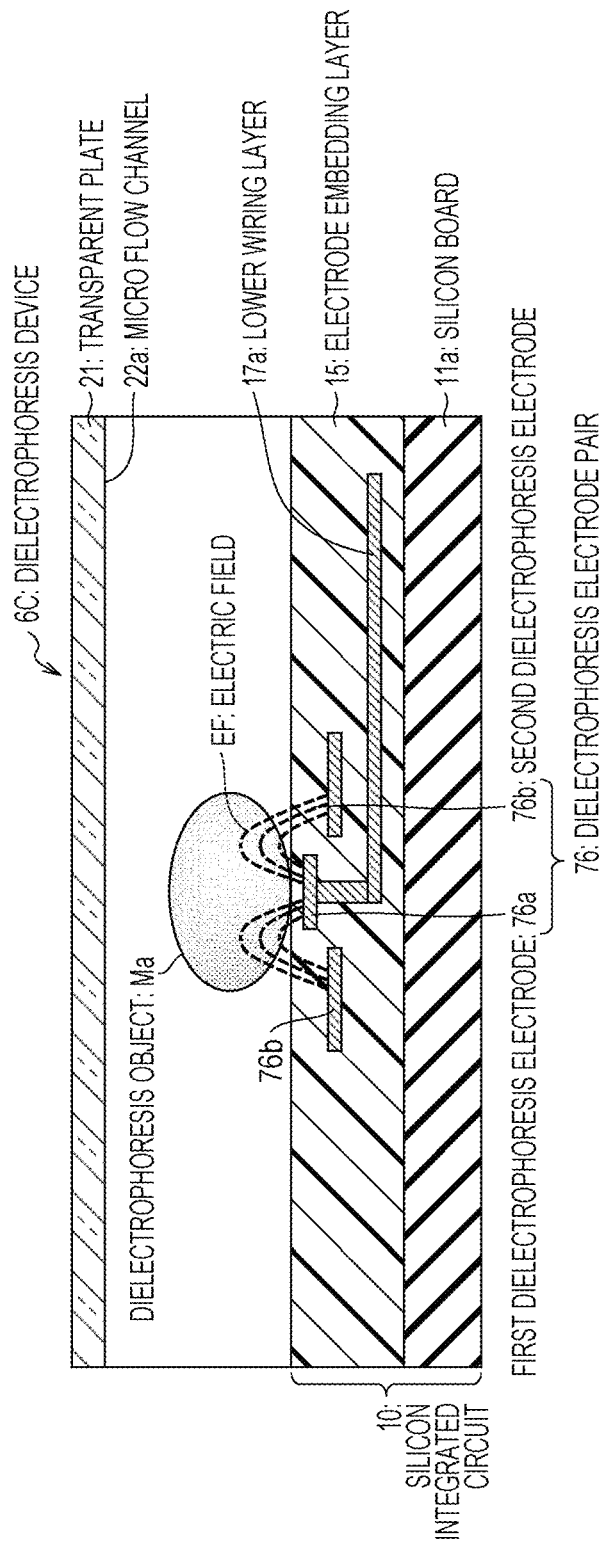
FIG. 15 illustrates the dielectrophoresis device in another modified example and is a sectional view illustrating a configuration of a dielectrophoresis electrode pair.

A still another embodiment of the invention will be described as follows with reference to FIGS. 13 to 15. Note that, the present embodiment is the same as Embodiment 7 and Embodiment 8 described above other than a configuration described in the present embodiment. For convenience of description, members having the same functions as those of the members illustrated in the figures of Embodiment 7 and Embodiment 8 described above will be given the same reference signs and description thereof will be omitted.

In the first dielectrophoresis electrode 71a and the second dielectrophoresis electrode 71b in the dielectrophoresis electrode pair 71 of the dielectrophoresis device 6A of Embodiment 7 described above or the first dielectrophoresis electrode 72a and the second dielectrophoresis electrode 72b in the dielectrophoresis electrode pair 72 of the dielectrophoresis device 6B of Embodiment 8 described above, the first dielectrophoresis electrode 71a and the second dielectrophoresis electrode 71b or the first dielectrophoresis electrode 72a and the second dielectrophoresis electrode 72b are provided linearly facing with each other with the gap G in between.

On the other hand, a dielectrophoresis device 6C of the present embodiment is different in that, around a first dielectrophoresis electrode 73a provided in a center, a second dielectrophoresis electrode 73b is provided with the gap G in between.

A configuration of the dielectrophoresis device 6C of the present embodiment will be described with reference to FIGS. 13(a) and 13(b). FIG. 13(a) is a sectional view illustrating a configuration of the dielectrophoresis device 6C in the present embodiment. FIG. 13(b) is a plan view illustrating a configuration of a dielectrophoresis electrode pair 73 of the dielectrophoresis device 6C.

In the dielectrophoresis device 6C of the present embodiment, as illustrated in FIGS. 13(a) and 13(b), the dielectrophoresis electrode pair 73 is provided in the electrode embedding layer 15 in the silicon integrated circuit 10. The dielectrophoresis electrode pair 73 is formed in a highest layer of the electrode embedding layer 15 and the lower wiring layer 17a that applies a voltage to the dielectrophoresis electrode pair 73 is formed by using a lower layer.

In particular, the dielectrophoresis electrode pair 73 of the present embodiment is constituted by the first dielectrophoresis electrode 73a and the second dielectrophoresis electrode 73b and is formed so that the second dielectrophoresis electrode 73b surrounds the first dielectrophoresis electrode 73a with the gap G in between.

In the present embodiment, a region including at least the first dielectrophoresis electrode 73a in a center part and the gap G existing between the first dielectrophoresis electrode 73a and the second dielectrophoresis electrode 73b is arranged so as to be covered with the dielectrophoresis object Ma.

Thus, when one dielectrophoresis object Ma such as a cell is captured, a part where the electric field is strong is covered with the dielectrophoresis object Ma, so that no more dielectrophoresis object Ma is captured.

In this manner, in the dielectrophoresis device 6C of the present embodiment, the second dielectrophoresis electrode 73b is provided around the first dielectrophoresis electrode 73a with the gap G in between.

Thereby, it is possible to provide the dielectrophoresis device 6C that is able to prevent the plurality of dielectrophoresis objects Ma from being captured also in the dielectrophoresis electrode pair 73 in which the first dielectrophoresis electrode 73a and the second dielectrophoresis electrode 73b are concentrically provided with the gap G in between and prevent a flow of the dielectrophoresis object Ma from being hindered near the dielectrophoresis electrode pair 73.

Note that, the invention is not limited to the aforementioned embodiments and may be modified in various manners within the scope of the invention. For example, in the aforementioned embodiment, the first dielectrophoresis electrode 73a has a circular shape provided in the center. However, the shape of the first dielectrophoresis electrode 73a in the center part is not particularly limited thereto and may be modified. Specifically, for example, as illustrated in FIG. 14(a), a dielectrophoresis electrode pair 74 in which a first dielectrophoresis electrode 74a in a center part is formed to be combined with a small electrode and a second dielectrophoresis electrode 74b is formed therearound is possible. Additionally, for example, as illustrated in FIG. 14(b), a dielectrophoresis electrode pair 75 in which a first dielectrophoresis electrode 75a has a doughnut shape and a second dielectrophoresis electrode 75b is formed therearound with the gap G in between is possible. Note that, an inside of the first dielectrophoresis electrode 74a serves as an open part.

Also with such a configuration, for example, in a fluorescent testing system that adopts the configuration, a region where light output from the dielectrophoresis object Ma is able to be transmitted is able to be increased in a center part. Additionally, in a case where a testing method of observing fluorescence emitted from the dielectrophoresis object Ma from an opposite side of the dielectrophoresis device 6C is used, transmittance of the fluorescence is able to be increased so that detection is easily performed.

Further, in the dielectrophoresis electrode pair 73 in the aforementioned embodiment, the first dielectrophoresis electrode 73a and the second dielectrophoresis electrode 73b are provided on the same plane. However, there is no particular limitation thereto, and, for example, as illustrated in FIG. 15, a dielectrophoresis electrode pair 76 in which a second dielectrophoresis electrode 76b that is a second electrode is formed by using a wiring layer lower than a first dielectrophoresis electrode 76a that is a first electrode is also possible.

In this manner, when the second dielectrophoresis electrode 76b is arranged to be lower than the first dielectrophoresis electrode 76a, a region which is projected from a surface of the electrode embedding layer 15 and has the strong electric field EF is limited to a part near the first dielectrophoresis electrode 76a in comparison with the arrangement illustrated in FIG. 13(a) in which the first dielectrophoresis electrode 73a and the second dielectrophoresis electrode 73b are provided on the same plane. Thus, also when the dielectrophoresis object Ma, such as a cell, which is captured has a slightly smaller size than an assumed standard size, the part where the electric field is strong is covered with the dielectrophoresis object Ma. As a result, it is possible to prevent more dielectrophoresis objects Ma from being captured by the dielectrophoresis electrode pair 76.

Embodiment 10

A still another embodiment of the invention will be described as follows with reference to FIG. 16. Note that, the present embodiment is the same as Embodiment 7 to Embodiment 9 described above other than a configuration described in the present embodiment. For convenience of description, members having the same functions as those of the members illustrated in the figures of Embodiment 7 to Embodiment 9 described above will be given the same reference signs and description thereof will be omitted.

In the dielectrophoresis device 6A, 6B, or 6C of Embodiment 7, 8, or 9 described above, one dielectrophoresis electrode pair 71, 72, or 73 is provided.

On the other hand, a dielectrophoresis device 6D of the present embodiment is different in that a plurality of dielectrophoresis electrode pairs 77 are provided.

A configuration of the dielectrophoresis device 6D of the present embodiment will be described with reference to FIG. 16. FIG. 16 is a sectional view illustrating the configuration of the dielectrophoresis device 6D in the present embodiment.

For example, the dielectrophoresis device 6D of the present embodiment is applicable to a fluorescent testing system in which the dielectrophoresis object Ma, such as a minute biological or nonbiological sample, in fluid flowing in the micro flow channel 22a is captured and a fluorescent phenomenon from the dielectrophoresis object Ma is observed to thereby specify the test object.

In such a fluorescent testing system, for example, there is a case where the dielectrophoresis object Ma of an intended type is desired to be captured by a plurality of electrode pairs.

In such a case, when it is identified that the dielectrophoresis object Ma that is captured does not have the intended type by means of fluorescence observation, visible light observation, or the like, it is desired that the dielectrophoresis object Ma is separated and a new dielectrophoresis object Ma is captured.

Figure 16:
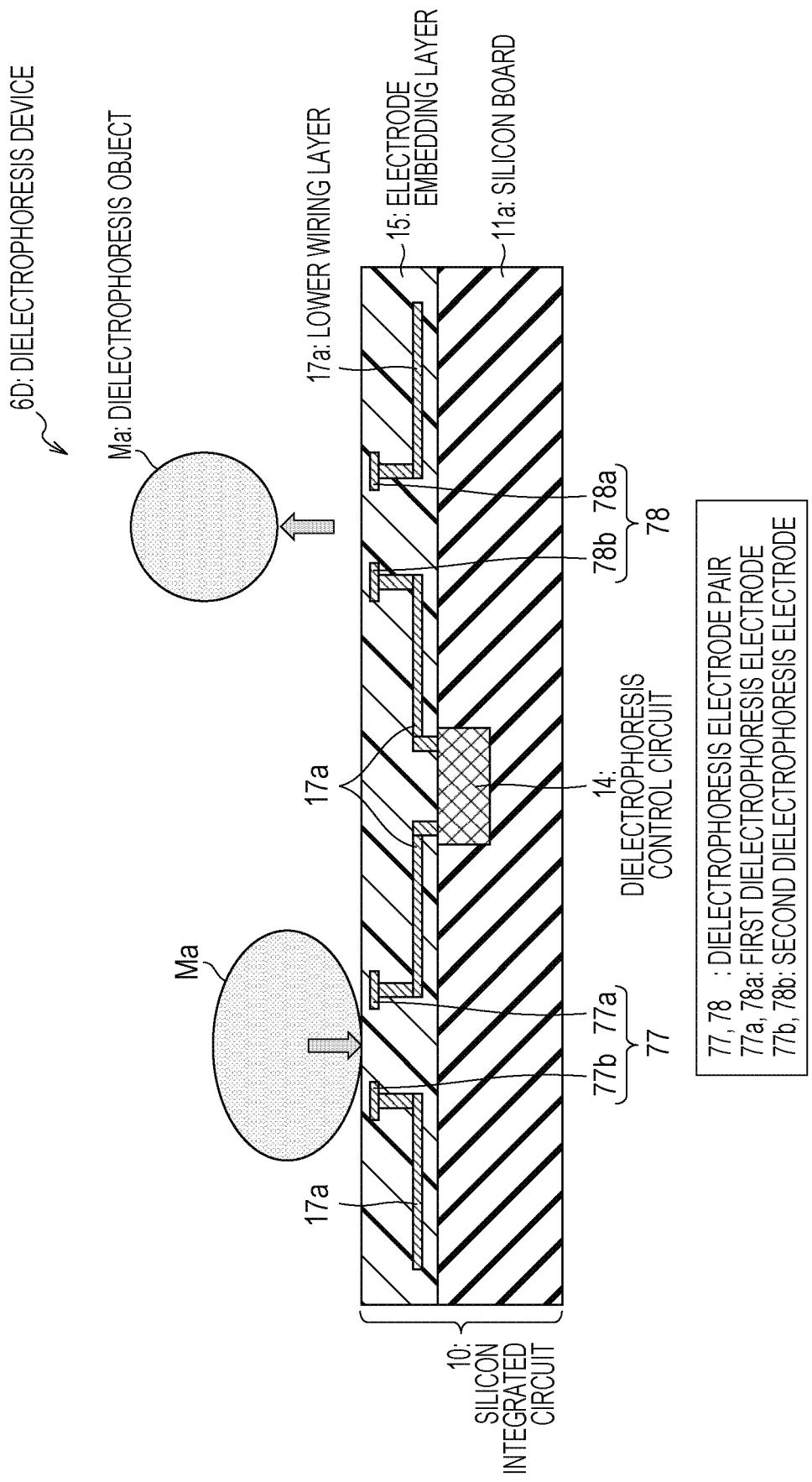
FIG. 16 illustrates a dielectrophoresis device in Embodiment 10 of the invention and is a sectional view illustrating a configuration of the dielectrophoresis device.

Thus, in the dielectrophoresis device 6D of the present embodiment, as illustrated in FIG. 16, a plurality of electrode pairs such as a dielectrophoresis electrode pair 77 and a dielectrophoresis electrode pair 78 are provided. At least a part of a first dielectrophoresis electrode 77a and a second dielectrophoresis electrode 77b of the dielectrophoresis electrode pair 77 is allowed to change whether the electric field is applied, or an amplitude or frequency of the electric field, independently from the other of the electrode pairs. The same is also applied to a first dielectrophoresis electrode 78a and a second dielectrophoresis electrode 78b of the dielectrophoresis electrode pair 78.

In this manner, in the present embodiment, each of the dielectrophoresis electrode pair 77 and the dielectrophoresis electrode pair 78 are allowed to change whether the electric field is applied, or an amplitude or frequency of the electric field, independently from the other of the electrode pairs.

Thereby, by changing whether the electric field is applied to the electrode pair, or an amplitude or frequency of the electric field, an attractive force is able to be acted on the dielectrophoresis object Ma, and a repulsive force or the like is also able to be acted thereon. In the present embodiment, such change is able to be performed independently from the other of the electrode pairs. As a result, an unnecessary dielectrophoresis object Ma is able to be separated. Accordingly, it becomes possible to collect only a necessary dielectrophoresis object Ma by the dielectrophoresis device 6D to perform measurement, and the dielectrophoresis device 6D that is highly convenient is able to be provided.

Embodiment 11

Figure 17:
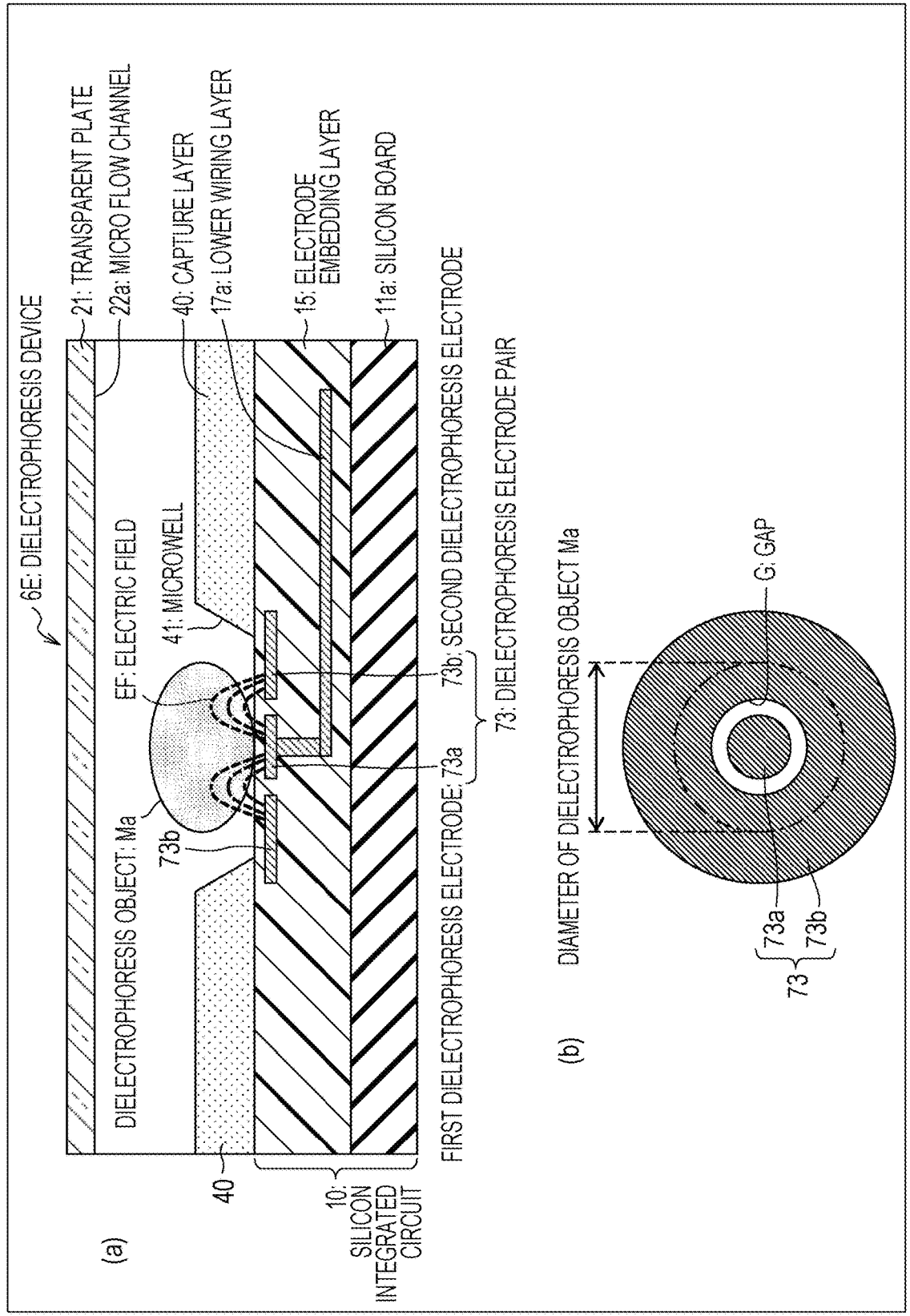
FIG. 17(a) illustrates a dielectrophoresis device in Embodiment 11 of the invention and is a sectional view illustrating a configuration of the dielectrophoresis device and FIG. 17(b) is a plan view illustrating a configuration of a dielectrophoresis electrode pair of the dielectrophoresis device.
Figure 18:
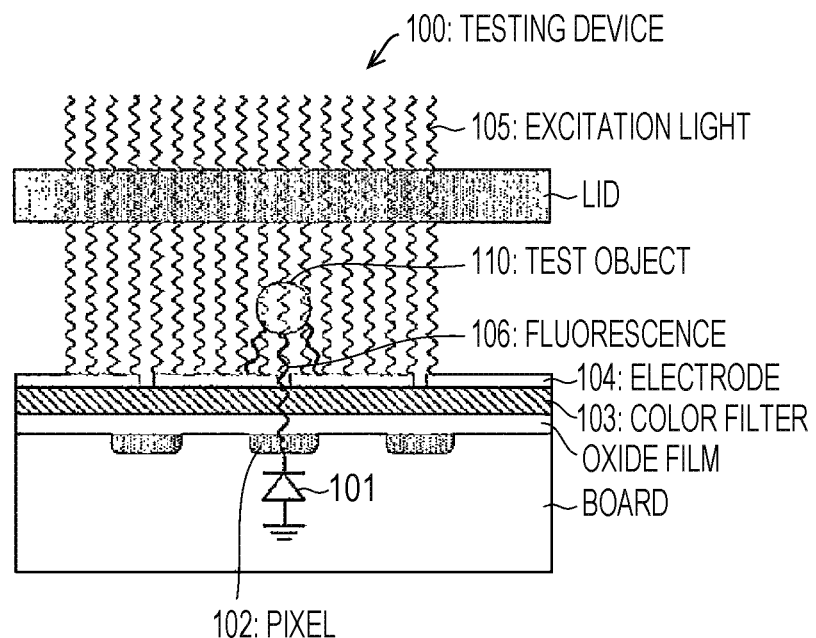
FIG. 18 is a sectional view illustrating a configuration of a testing device of the related art that detects fluorescence from a fine particle in fluid.

A still another embodiment of the invention will be described as follows with reference to FIG. 17. Note that, the present embodiment is the same as Embodiment 9 described above other than a configuration described in the present embodiment. For convenience of description, members having the same functions as those of the members illustrated in the figures of Embodiment 9 described above will be given the same reference signs and description thereof will be omitted.

A dielectrophoresis device 6E of the present embodiment is different in that the capture layer 40 having the microwell 41 as the through hole through which the dielectrophoresis object Ma as a capture material is captured is formed above the dielectrophoresis electrode pair 73 in the dielectrophoresis device 6C of Embodiment 9.

A configuration of the dielectrophoresis device 6E of the present embodiment will be described with reference to FIGS. 17(a) and 17(b). FIG. 17(a) illustrates the dielectrophoresis device 6E in the present embodiment and is a sectional view illustrating the configuration of the dielectrophoresis device 6E. FIG. 17(b) is a plan view illustrating a configuration of the dielectrophoresis electrode pair 73 of the dielectrophoresis device 6E.

As illustrated in FIGS. 17(a) and 17(b), the dielectrophoresis device 6E of the present embodiment includes the dielectrophoresis electrode pair 73 that captures, by dielectrophoresis, the dielectrophoresis object Ma as the capture material flowing in the micro flow channel 22a. The dielectrophoresis electrode pair 73 is constituted by the first dielectrophoresis electrode 73a and the second dielectrophoresis electrode 73b, and a region including at least the first dielectrophoresis electrode 73a and the gap G between the first dielectrophoresis electrode 73a and the second dielectrophoresis electrode 73b is formed so as to be covered with one dielectrophoresis object Ma.

In the present embodiment, particularly above the dielectrophoresis electrode pair 73, the capture layer 40 that captures the dielectrophoresis object Ma is formed. The microwell 41 as the through hole through which one dielectrophoresis object Ma is inserted is formed at a position of the gap G in plan view between the first dielectrophoresis electrode 73a and the second dielectrophoresis electrode 73b in the capture layer 40.

Thereby, one dielectrophoresis object Ma is fitted and captured in the microwell 41 in the capture layer 40. This makes it possible to easily capture one dielectrophoresis object Ma.

A fluorescent testing system 1 to 5 in an aspect 1 of the invention includes: an excitation light source 23 that radiates excitation light L1 to a test object M flowing in a flow channel (microfluidic channel 22); a silicon integrated circuit 10 provided with a photon detection unit 13 that detects light by a photodiode 12; a dielectrophoresis electrode pair 16, 31, or 32 that generates an electric field EF to draw the test object M onto the photodiode 12 by dielectrophoresis; and a control unit 24 that causes the excitation light source 23 to radiate the excitation light L1 to the test object M drawn by the dielectrophoresis and causes the photon detection unit 13, after extinguishment of the excitation light L1, to detect fluorescence L2 emitted from the test object M.

According to the invention described above, the fluorescent testing system includes the excitation light source that radiates the excitation light to the test object flowing in the flow channel, the silicon integrated circuit provided with the photon detection unit that detects light by the photodiode, and the electrode pair that generates the electric field to draw the test object onto the photodiode by the dielectrophoresis.

In such a kind of fluorescent testing system of the related art, by utilizing a difference of a wavelength of the excitation light and a wavelength of the fluorescence, the excitation light and the fluorescence are separated by an optical filter to detect only the fluorescence. Thus, only a fluorescent material suitable for an incorporated filter is able to be used for the test and there is a problem that an application range of a type of the fluorescence is limited.

Meanwhile, a phenomenon of the fluorescence is such that a molecule and an ion that absorb ultraviolet light or visible light are excited, and then, the molecule and the ion are shifted to an intermediate excited state to emit light having a wavelength longer than that of the excitation light therefrom and are returned to a ground state, and an average time during which the excited state is returned to the ground state is called a fluorescent lifetime. Accordingly, by using the fluorescent lifetime, the fluorescence that is emitted is able to be observed after the extinguishment of the excitation light without using an optical filter that separates the excitation light and the fluorescence on the basis of the wavelengths.

Thus, the invention includes the control unit that causes the excitation light source to radiate the excitation light to the test object that is drawn and causes the photon detection unit, after extinguishment of the excitation light, to detect the fluorescence emitted from the test object.

As a result, only the fluorescence is detected by the photon detection unit after the extinguishment of the excitation light. Thus, it is possible to provide the fluorescent testing system that measures only the fluorescence emitted from the test object without separating the excitation light and the fluorescence by an optical filter and is able to prevent reduction of an application range of a type of the fluorescence.

In the fluorescent testing system 2 in an aspect 2 of the invention, it is preferable that, in the fluorescent testing system of the aspect 1, a capture layer 40 that captures the test object M is formed above the dielectrophoresis electrode pair (the first dielectrophoresis electrode pair 31 and the second dielectrophoresis electrode pair 32), and a through hole (microwell 41) through which one piece of the test object M is inserted and the fluorescence is passed is formed at a position of the photodiode 12 in plan view in the capture layer 40.

Thereby, it is possible that one test object is fitted and captured in the through hole formed at the position of the photodiode in plan view in the capture layer and only the fluorescence emitted from the one test object is measured by the photodiode by causing the fluorescence to pass through the through hole. Thus, since one test object is easily captured and the captured one test object is held at the position of the through hole, it is possible to reliably measure the fluorescence emitted only from the captured one test object.

In the fluorescent testing system 3 in an aspect 3 of the invention, in the fluorescent testing system of the aspect 2, the capture layer 40 is formed so that a plurality of point-like protrusions (columnar capture layers 42) or linear protrusions (linear protrusion capture layers 44) are arranged side by side.

For example, there is a case where the capture layer has a property that the capture layer tends to allow bonding to the test object depending on a material of the capture layer that captures the test object. Thus, in the fluorescent testing system in the aspect of the invention, the capture layer is formed so that the plurality of point-like protrusions or the linear protrusions are arranged side by side. Thereby, a surface where the capture layer contacts the test object is reduced, so that the test object is difficult to be bonded to the capture layer. As a result, a case where the test object flowing in the flow channel is bonded to the capture layer and electrophoresis of the test object is hindered is suppressed.

In the fluorescent testing system 4 in an aspect 4 of the invention, in the fluorescent testing system of the aspect 1, 2, or 3, to prevent external light other than the fluorescence from the test object drawn onto the photodiode by the dielectrophoresis from being incident on the photodiode, one electrode of the dielectrophoresis electrode pair is arranged at a position where the external light is shielded.

Thereby, above the photodiode, one electrode of the dielectrophoresis electrode pair is used to shield light in a part other than a part above the photodiode. As a result, an increase in the number of components is avoided and it is possible to prevent stray light by external light from being incident on the photodiode from the part other than the part above the photodiode.

Thus, a highly accurate test result is able to be obtained and it is possible to provide the fluorescent testing system that is highly reliable.

In the fluorescent testing system 5 in an aspect 5 of the invention, in the fluorescent testing system of any one of the aspects 1 to 4, the silicon integrated circuit includes an electrode pair for high electric field application that applies a predetermined high electric field by which a cell membrane of a cell as the test object drawn onto the photodiode is broken.

Thereby, detection of the fluorescence is able to be performed by breaking the cell membrane of the cell that is captured by the dielectrophoresis electrode pair by dielectrophoresis and adding a fluorescent label to a gene in the cell. As a result, it is possible to analyze the cell in more detail.

In the fluorescent testing system 1 to 5 in an aspect 6 of the invention, it is preferable that the dielectrophoresis electrode pair 16, 31, 32, or 56 is constituted by a first dielectrophoresis electrode 16*a*, 31*a*, 32*a*, or 56*a* and a second dielectrophoresis electrode 16*b*, 31*b*, 32*b*, or 56*b*, and a region including at least the first dielectrophoresis electrode 16*a*, 31*a*, 32*a*, or 56*a* and a gap (electrode hole 51) between the first dielectrophoresis electrode 16*a*, 31*a*, 32*a*, or 56*a* and the second dielectrophoresis electrode 16*b*, 31*b*, 32*b*, or 56*b* is formed so as to be covered with one piece of the test object M.

Thereby, only one test object is captured by the dielectrophoresis electrode pair. Additionally, there is no case where retaining of a plurality of test objects hinders a flow of another test object that flows in the flow channel.

Thus, it is possible to provide the fluorescent testing system that is able to prevent the plurality of test objects from being captured and prevent a flow of the test object from being hindered near the dielectrophoresis electrode pair.

A molecular testing method in an aspect 7 of the invention is a molecular testing method using the fluorescent testing system described above, and includes: a first step of mixing a microbead having a capture antibody with a detection antibody, further combining a captured target molecule with the detection antibody, and causing solution, which includes the microbead, to flow in the flow channel (microfluidic channel 22) of the fluorescent testing system 2 according to the aspect 2; a second step of capturing, by dielectrophoresis in the fluorescent testing system 2, the microbead in the through hole (microwell 41) of the capture layer 40 formed above the dielectrophoresis electrode pair (the first dielectrophoresis electrode pair 31 and the second dielectrophoresis electrode pair 32); a third step of causing a fluorescent substrate to flow in the flow channel (microfluidic channel 22); and a fourth step of detecting, by the fluorescent testing system 2, a fluorescent material generated when the fluorescent substrate reacts with an enzymatic label.

According to the aspect of the invention, since the generation of the fluorescent material is performed in a limited region of the through hole, the fluorescence is generated intensively on the photodiode and the detection is able to be performed even when the number of target molecules is small.

Such a detection method of the related art has been performed by using a fluorescent microscope, however, according to the present aspect, neither fluorescent microscope nor image processing of a captured image thereof is necessary. As a result, it is possible to provide the simple molecular testing method including the fluorescent testing system 2.

A dielectrophoresis device 6A to 6E in an aspect 8 of the invention is a dielectrophoresis device including at least one dielectrophoresis electrode pair 71 to 78 that captures, by dielectrophoresis, a capture material (dielectrophoresis object Ma) flowing in a micro flow channel 22*a*, in which the at least one dielectrophoresis electrode pair 71 to 78 is constituted by a first dielectrophoresis electrode 71*a* to 78*a* and a second dielectrophoresis electrode 71*b* to 78*b*, and a region including at least the first dielectrophoresis electrode 71*a* to 78*a* and a gap G between the first dielectrophoresis electrode 71*a* to 78*a* and the second dielectrophoresis electrode 71*b* to 78*b* is formed so as to be covered with one piece of the capture material (dielectrophoresis object Ma).

According to the aforementioned configuration, the dielectrophoresis device includes the dielectrophoresis electrode pair that captures, by dielectrophoresis, the capture material flowing in the micro flow channel.

Such a kind of dielectrophoresis device of the related art has a problem that a plurality of capture materials flowing in the micro flow channel are captured by the dielectrophoresis electrode pair, and therefore, when a capture material is a target subjected to any test, for example, measurement of a single capture material is hindered. There is also a problem that the plurality of capture materials captured by the dielectrophoresis electrode pair hinder a flow of another capture material flowing in the micro flow channel.

Thus, in the aspect of the invention, the dielectrophoresis electrode pair is constituted by the first dielectrophoresis electrode and the second dielectrophoresis electrode, and the region including at least the first dielectrophoresis electrode and the gap between the first dielectrophoresis electrode and the second dielectrophoresis electrode is formed so as to be covered with one piece of the capture material. Therefore, only one capture material is captured by the dielectrophoresis electrode pair. Additionally, there is no case where retaining of the plurality of capture materials hinders a flow of another capture material that flows in the micro flow channel.

Thus, it is possible to provide the dielectrophoresis device that is able to prevent the plurality of capture materials from being captured and prevent a flow of the capture material from being hindered near the dielectrophoresis electrode pair.

In the dielectrophoresis device 6C in an aspect 9 of the invention, the second dielectrophoresis electrode 73*b* is provided around the first dielectrophoresis electrode 73*a* with the gap G in between, in the dielectrophoresis device in the aspect 8.

Thereby, it is possible to provide the dielectrophoresis device that is able to prevent the plurality of capture materials from being captured also in the dielectrophoresis electrode pair in which the first dielectrophoresis electrode and the second dielectrophoresis electrode are concentrically provided with the gap in between and prevent a flow of the capture material from being hindered near the dielectrophoresis electrode pair.

In the dielectrophoresis device 6B in an aspect 10 of the invention, it is preferable that, in the dielectrophoresis device in the aspect 8 or 9, the first dielectrophoresis electrode 72a, the gap G, and a part of the second dielectrophoresis electrode 72b are formed so as to be covered with one piece of the capture material (dielectrophoresis object Ma) and a variable potential is applied to the first dielectrophoresis electrode 72a.

In the dielectrophoresis electrode pair, at each end surface of the dielectrophoresis electrode pair that faces the gap, the electric field is maximized, and an attractive force of the dielectrophoresis electrode pair with respect to the capture material is maximized. In particular, when the variable potential such as an alternating-current voltage is applied to, for example, the first dielectrophoresis electrode of the dielectrophoresis electrode pair, the attractive force of the first dielectrophoresis electrode with respect to the capture material is maximized.

Thus, in the aspect of the invention, the first dielectrophoresis electrode, the gap, and a part of the second dielectrophoresis electrode are formed so as to be covered with one piece of the capture material and the variable potential is applied to the first dielectrophoresis electrode.

Thereby, when one capture material is captured, the first dielectrophoresis electrode that is a part where the electric field is strong is covered with the capture material, so that it is possible to prevent more capture materials from being captured.

In the dielectrophoresis device 6C in an aspect 11 of the invention, it is preferable that the second dielectrophoresis electrode 76b is arranged so as to be lower than the first dielectrophoresis electrode 76a, in the dielectrophoresis device in the aspect 9.

Thereby, also when the dielectrophoresis object, such as a cell, which is captured has a size slightly smaller than an assumed standard size, the part where the electric field is strong is covered with the dielectrophoresis object. As a result, it is possible to prevent more dielectrophoresis objects from being captured by the dielectrophoresis electrode pair.

In the dielectrophoresis device 6A to 6D in an aspect 12 of the invention, it is preferable that, in the dielectrophoresis device in any one of the aspects 8 to 11, a wire for controlling a voltage of the at least one dielectrophoresis electrode pair 71 to 78 is formed by using a wiring layer (lower wiring layer 17a) below the at least one dielectrophoresis electrode pair 71 to 78.

In a case where the wiring layer of the dielectrophoresis electrode pair exists on the same plane as the dielectrophoresis electrode pair, the electric field is formed up to the wiring layer. As a result, since the capture material is also captured in the wiring layer, a single capture material is not able to be captured.

Thus, in the aspect of the invention, the wire for controlling the voltage of the dielectrophoresis electrode pair is formed by using the wiring layer below the dielectrophoresis electrode pair. Thereby, there is no case where the capture material is captured by the wiring layer.

Accordingly, it is possible to reliably prevent a plurality of capture materials from being captured.

The dielectrophoresis device 6D in an aspect 13 of the invention, it is preferable that, in the dielectrophoresis device in any one of the aspects 8 to 12, the at least one dielectrophoresis electrode pair 77 and 78 includes a plurality of dielectrophoresis electrode pairs 77 and 78 are provided, and a part of the plurality of dielectrophoresis electrode pairs 77 and 78 is allowed to change whether an electric field is applied, or an amplitude or frequency of the electric field, independently from the other of the plurality of dielectrophoresis electrode pairs 77 and 78.

In the dielectrophoresis device in the aspect of the invention, the plurality of dielectrophoresis electrode pairs are provided. This makes it possible to capture the capture material by the plurality of dielectrophoresis electrode pairs.

However, there is also a case where an unnecessary capture material is captured.

Thus, in the aspect of the invention, a part of the plurality of dielectrophoresis electrode pairs is allowed to change whether an electric field is applied, or an amplitude or frequency of the electric field, independently from the other of the dielectrophoresis electrode pairs.

Thereby, by changing whether the electric field is applied to the dielectrophoresis electrode pair or an amplitude or frequency of the electric field, an attractive force is able to be acted on the capture material, and a repulsive force or the like is also able to be acted thereon. In the present configuration, such change is able to be performed independently from the other of the dielectrophoresis electrode pairs. As a result, an unnecessary capture material is able to be separated.

Accordingly, it becomes possible to capture only a necessary capture material, and the dielectrophoresis device that is highly convenient is able to be provided.

In the dielectrophoresis device 6E in an aspect 14 of the invention, it is preferable that, in the dielectrophoresis device in any one of the aspects 8 to 13, a capture layer 40 that captures the capture material (dielectrophoresis object Ma) is formed above the at least one dielectrophoresis electrode pair 71 to 78, and a through hole (microwell 41) through which one piece of the capture material (dielectrophoresis object Ma) is inserted is formed at a position of a gap G in plan view between the first dielectrophoresis electrode (71a to 78a) and the second dielectrophoresis electrode (71b to 78b) in the capture layer 40.

Thereby, it is possible that one capture material is fitted and captured in the through hole formed at the position of the gap in plan view between the first dielectrophoresis electrode and the second dielectrophoresis electrode in the capture layer. Thus, one capture material is able to be easily captured.

Note that, the invention is not limited to each of the embodiments described above, and may be modified in various manners within the scope indicated in the claims and an embodiment achieved by appropriately combining technical means disclosed in each of different embodiments is also encompassed in the technical scope of the invention. Further, by combining the technical means disclosed in each of the embodiments, a new technical feature may be formed.

REFERENCE SIGNS LIST 1 to 5 fluorescent testing system
6A to 6E dielectrophoresis device
10 silicon integrated circuit
11 silicon circuit board
12 photodiode
13 photon detection unit
13a first photon detection unit
13b second photon detection unit
14 dielectrophoresis control circuit
15 electrode embedding layer 16 dielectrophoresis electrode pair
16a, 16b dielectrophoresis electrode
17 lower layer wire
17a lower wiring layer
21 transparent plate
22 microfluidic channel (micro flow channel)
22a micro flow channel
23 excitation light source
24 control unit
31 first dielectrophoresis electrode pair
31a, 31b dielectrophoresis electrode
32 second dielectrophoresis electrode pair
32a, 32b dielectrophoresis electrode
40 capture layer
41 microwell (through hole)
42 columnar capture layer (point-like protrusion)
43 microwell (through hole)
44 linear protrusion capture layer (linear protrusion)
51 electrode hole (gap)
56 dielectrophoresis electrode pair
56a light shielding electrode
56b dielectrophoresis electrode
61 electrode pair for high electric field application
71 dielectrophoresis electrode pair
71a first dielectrophoresis electrode
71b second dielectrophoresis electrode
72 dielectrophoresis electrode pair
72a first dielectrophoresis electrode
72b second dielectrophoresis electrode
73 to 76 dielectrophoresis electrode pair
73a to 76a first dielectrophoresis electrode
73b to 76b second dielectrophoresis electrode
77, 78 dielectrophoresis electrode pair
77a, 78a first dielectrophoresis electrode
77b, 78b second dielectrophoresis electrode
L1 excitation light
L2 fluorescence
M test object
Ma dielectrophoresis object (capture material)

The invention claimed is:

1. A fluorescent testing system comprising:
an excitation light source that radiates excitation light to a test object flowing in a flow channel;
a silicon integrated circuit provided with a photon detection circuit that detects light by a photodiode;
a dielectrophoresis electrode pair that generates an electric field to draw the test object onto the photodiode by dielectrophoresis;
a control circuit that causes the excitation light source to radiate the excitation light to the test object drawn by the dielectrophoresis and causes the photon detection circuit, after extinguishment of the excitation light, to detect fluorescence emitted from the test object;
a capture layer that captures the test object provided above the dielectrophoresis electrode pair; and
a through hole, by which one piece of the test object is captured and through which the fluorescence is passed, is provided at a position of the photodiode in plan view in the capture layer.

2. The fluorescent testing system according to claim 1, wherein the capture layer comprises a plurality of point-like protrusions or linear protrusions.

3. The fluorescent testing system according to claim 1, wherein, to prevent external light other than the fluorescence from the test object drawn onto the photodiode by the dielectrophoresis from being incident on the photodiode, one electrode of the dielectrophoresis electrode pair is arranged at a position where the external light is shielded by the one electrode.

4. The fluorescent testing system according to claim 1, wherein the silicon integrated circuit includes an electrode pair for high electric field application that applies a predetermined high electric field by which a cell membrane of a cell as the test object drawn onto the photodiode is broken.

5. The fluorescent testing system according to claim 1, wherein the dielectrophoresis electrode pair comprises a first dielectrophoresis electrode and a second dielectrophoresis electrode, one piece of the test object is disposed so as to cover a specific region, and the specific region includes at least the first dielectrophoresis electrode and a gap between the first electrophoresis electrode and the second electrophoresis electrode.

6. A molecular testing method using the fluorescent testing system according to claim 1, the molecular testing method further comprising:
a first step of mixing a microbead having a capture antibody with a detection antibody, further combining a captured target molecule with the detection antibody, and causing solution, which includes the microbead, to flow in the flow channel of the fluorescent testing system;
a second step of capturing, by dielectrophoresis in the fluorescent testing system, the microbead in the through hole of the capture layer formed above the dielectrophoresis electrode pair;
a third step of causing a fluorescent substrate to flow in the flow channel; and
a fourth step of detecting, by the fluorescent testing system, a fluorescent material generated when the fluorescent substrate reacts with an enzymatic label.

7. A dielectrophoresis device comprising:
an excitation light source that radiates excitation light to a test object flowing in a flow channel;
a silicon integrated circuit provided with a photon detection circuit that detects light by a photodiode; and
at least one dielectrophoresis electrode pair that generates an electric field to draw the test object onto the photodiode by dielectrophoresis, wherein:
the at least one dielectrophoresis electrode pair comprises a first dielectrophoresis electrode and a second dielectrophoresis electrode, one piece of capture material is disposed so as to cover a specific region in a state where the capture material is captured, and the specific region includes at least the first dielectrophoresis and a gap between the first electrophoresis electrode and the second electrophoresis electrode; and
the second dielectrophoresis electrode is provided around the first dielectrophoresis electrode with the gap therebetween.

8. The dielectrophoresis device according to claim 7, wherein
the first dielectrophoresis electrode, the gap, and a portion of the second dielectrophoresis electrode are formed so as to be covered with the one piece of the capture material, and
a variable potential is applied to the first dielectrophoresis electrode.

9. The dielectrophoresis device according to claim 7, wherein the second dielectrophoresis electrode is arranged so as to be below the first dielectrophoresis electrode.

10. The dielectrophoresis device according to claim 7, wherein a wire for controlling a voltage of the at least one dielectrophoresis electrode pair is formed by using a wiring layer below the at least one dielectrophoresis electrode pair.

11. The dielectrophoresis device according to claim 7, wherein the at least one dielectrophoresis electrode pair includes a plurality of dielectrophoresis electrode pairs, a dielectrophoresis control circuit is provided, the dielectrophoresis control circuit individually controlling electric fields generated by the corresponding plurality of dielectrophoresis electrode pairs, and the dielectrophoresis control circuit controls, for a portion of the plurality of dielectrophoresis electrode pairs, whether an electric field is applied, or an amplitude or frequency of the electric field, independently from the other of the plurality of dielectrophoresis electrode pairs.

12. A dielectrophoresis device comprising:

an excitation light source that radiates excitation light to a test object flowing in a flow channel;

a silicon integrated circuit provided with a photon detection circuit that detects light by a photodiode; and at least one dielectrophoresis electrode pair that generates an electric field to draw the test object onto the photodiode by dielectrophoresis, wherein:

the at least one dielectrophoresis electrode pair comprises a first dielectrophoresis electrode and a second dielectrophoresis electrode, one piece of capture material is disposed so as to cover a specific region in a state where the capture material is captured, and the specific region includes at least the first dielectrophoresis and a gap between the first electrophoresis electrode and the second electrophoresis electrode;

the dielectrophoresis device further comprises:

a capture layer that captures the capture material formed above the at least one dielectrophoresis electrode pair, the capture layer having a through hole through which the one piece of the capture material is inserted at a position of the gap in plan view between the first dielectrophoresis electrode and the second dielectrophoresis electrode in the capture layer; and the specific region including at least the first dielectrophoresis electrode and the gap is covered with the one piece of the capture material in a state where the one piece of the capture material is inserted into the through hole.

* * * * *